(12) United States Patent
Serhiy et al.

(10) Patent No.: US 10,998,584 B1
(45) Date of Patent: May 4, 2021

(54) BATTERY MANAGEMENT APPARATUS AND SYSTEM

(71) Applicant: SAMSUNG ELECTRONICS CO., LTD., Suwon-si (KR)

(72) Inventors: Khomych Serhiy, Lviv (UA);
Petrakivskyi Oleg, Zhytomyr (UA);
Baiev Oleksandr, Zaporizhzhia (UA);
Vitiuk Alina, Kyiv (UA)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 16/789,536

(22) Filed: Feb. 13, 2020

(30) Foreign Application Priority Data

Oct. 17, 2019 (KR) .................. 10-2019-0129073

(51) Int. Cl.
*H04B 10/00* (2013.01)
*H01M 10/42* (2006.01)
*H04B 10/40* (2013.01)

(52) U.S. Cl.
CPC .......... *H01M 10/425* (2013.01); *H04B 10/40* (2013.01); *H01M 2010/4271* (2013.01); *H01M 2010/4278* (2013.01)

(58) Field of Classification Search
CPC ..... H04B 10/11; H04B 10/112; H04B 10/114; H04B 10/116; H04B 10/40; H01M 10/425; H01M 10/482; H01M 10/441; H02J 7/025; H02J 7/0014; H02J 50/20
USPC ....... 398/118, 119, 127, 128, 130, 135, 136, 398/154, 155, 158, 159, 164; 320/108, 320/107, 109, 110, 132
See application file for complete search history.

(56) References Cited

U.S. PATENT DOCUMENTS

| | | | |
|---|---|---|---|
| 5,058,001 A | 10/1991 | Li | |
| 9,384,165 B1 | 7/2016 | Bao et al. | |
| 9,847,670 B2* | 12/2017 | Moshfeghi | H02J 7/00302 |
| 2015/0019771 A1 | 1/2015 | Greef et al. | |
| 2018/0012484 A1* | 1/2018 | Sakabe | G08C 25/00 |

(Continued)

FOREIGN PATENT DOCUMENTS

| | | |
|---|---|---|
| JP | 5677171 B2 | 2/2015 |
| KR | 10-1298155 B1 | 9/2013 |
| KR | 10-1632350 B1 | 6/2016 |

(Continued)

OTHER PUBLICATIONS

"SmartMesh IP Node 2.4GHz 802.15 4e Wireless Mote-on-Chip", *Linear Technology Corporation*, 2013 (38 pages in English).

(Continued)

*Primary Examiner* — Hanh Phan
(74) *Attorney, Agent, or Firm* — NSIP Law

(57) ABSTRACT

A battery management apparatus is provided. The battery management apparatus receives a first address assignment message from a first neighboring battery management apparatus through a first infrared (IR) communicator, sets an address of the battery management apparatus based on the received first address assignment message, determines an address of a second neighboring battery management apparatus based on the set address, and transmits a second address assignment message including the determined address to the second neighboring battery management apparatus through a second IR communicator.

20 Claims, 21 Drawing Sheets

(56) References Cited

U.S. PATENT DOCUMENTS

2019/0356143 A1* 11/2019 Lee .................... G01R 31/3835

FOREIGN PATENT DOCUMENTS

KR     10-2019-0089401 A    7/2019
WO    WO 2012/061262 A1    5/2012

OTHER PUBLICATIONS

Lee, Minkyu et al., "Wireless battery management system", 2013 *World Electric Vehicle Symposium and Exhibition (EVS27)*, 2013 (pp. 1-5).
"SmartMesh, Wireless Mesh for Tough Industrial IoT Applications", *Analog Devices, Inc.,* 2017 (12 pages in English).

\* cited by examiner

BATTERY MANAGEMENT APPARATUS AND SYSTEM

CROSS-REFERENCE TO RELATED APPLICATIONS

This application claims the benefit under 35 USC § 119(a) of Korean Patent Application No. 10-2019-0129073 filed on Oct. 17, 2019 in the Korean Intellectual Property Office, the entire disclosure of which is incorporated herein by reference for all purposes.

BACKGROUND

1. Field

The following description relates to a battery management apparatus and system.

2. Description of Related Art

A plurality of battery cells may be included in a single battery pack. A plurality of battery packs may operate as batteries that supply power to a single device, for example, an electric vehicle. A battery management system may monitor the states of the plurality of battery cells to efficiently manage the plurality of battery cells.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a battery management apparatus includes a processor configured to receive a first address assignment message from a first neighboring battery management apparatus through a first infrared (IR) communicator, set an address of the battery management apparatus based on the received first address assignment message, determine an address of a second neighboring battery management apparatus based on the set address, and transmit a second address assignment message including the determined address to the second neighboring battery management apparatus through a second IR communicator.

The received first address assignment message may include an address of the battery management apparatus determined by the first neighboring battery management apparatus, and an identifier of an IR communicator of the first neighboring battery management apparatus.

The processor may be further configured to set an identifier of each of a plurality of IR communicators included in the battery management apparatus based on the received first address assignment message.

The processor may be further configured to transmit an acknowledgement message including the set address to the first neighboring battery management apparatus.

The processor may be further configured to update a message transmission table in response to the transmitted acknowledgement message being received.

The processor may be further configured to receive an acknowledgement message including the address of the second neighboring battery management apparatus from the second neighboring battery management apparatus; and transmit the received acknowledgement message to the first neighboring battery management apparatus.

The processor may be further configured to receive a synchronization message from the first neighboring battery management apparatus through the first IR communicator, and transmit the received synchronization message to the second neighboring battery management apparatus through the second IR communicator.

The processor may be further configured to determine a sensing timing based on the received synchronization message.

The processor may be further configured to transmit sensing data of a battery corresponding to the battery management apparatus to the first neighboring battery management apparatus, and in response to receiving sensing data from the second neighboring battery management apparatus, transmit the received sensing data to the first neighboring battery management apparatus.

The processor may be further configured to determine whether each of a plurality of IR communicators in the battery management apparatus is activated.

In a general aspect, a battery management system includes a plurality of slave battery management apparatuses; and a master battery management apparatus configured to control the plurality of slave battery management apparatuses, wherein at least one of the slave battery management apparatuses is configured to receive a first address assignment message from a first neighboring slave battery management apparatus through a first infrared (IR) communicator, set an address of each of the slave battery management apparatuses based on the first received address assignment message, determine an address of a second neighboring slave battery management apparatus based on the set address, and transmit a second address assignment message including the determined address to the second neighboring slave battery management apparatus through a second IR communicator.

The received first address assignment message may include an address determined by the first neighboring slave battery management apparatus, and an identifier of an IR communicator of the first neighboring slave battery management apparatus.

At least one of the slave battery management apparatuses may be configured to set an identifier of each of a plurality of IR communicators based on the received first address assignment message.

At least one of the plurality of slave battery management apparatuses may be configured to transmit an acknowledgement message including the set address to the first neighboring slave battery management apparatus.

At least one of the plurality of slave battery management apparatuses may be configured to update a message transmission table in response to the transmitted acknowledgement message being received.

At least one of the slave battery management apparatuses may be configured to receive an acknowledgement message including the address of the second neighboring slave battery management apparatus from the second neighboring slave battery management apparatus, and transmit the received acknowledgement message to the first neighboring slave battery management apparatus.

At least one of the plurality of slave battery management apparatuses may be configured to receive a synchronization message from the first neighboring slave battery management apparatus through the first IR communicator, and transmit the received synchronization message to the second neighboring slave battery management apparatus through the second IR communicator.

At least one of the plurality of slave battery management apparatuses may be configured to determine a sensing timing based on the received synchronization message.

At least one of the plurality of slave battery management apparatuses may be configured to transmit sensing data of a corresponding battery to the first neighboring slave battery management apparatus, and in response to receiving sensing data from the second neighboring slave battery management apparatus, transmit the received sensing data to the first neighboring slave battery management apparatus.

At least one of the plurality of slave battery management apparatuses may be configured to determine whether each of a plurality of IR communicators is activated.

Other features and aspects will be apparent from the following detailed description, the drawings, and the claims.

Figure 1:
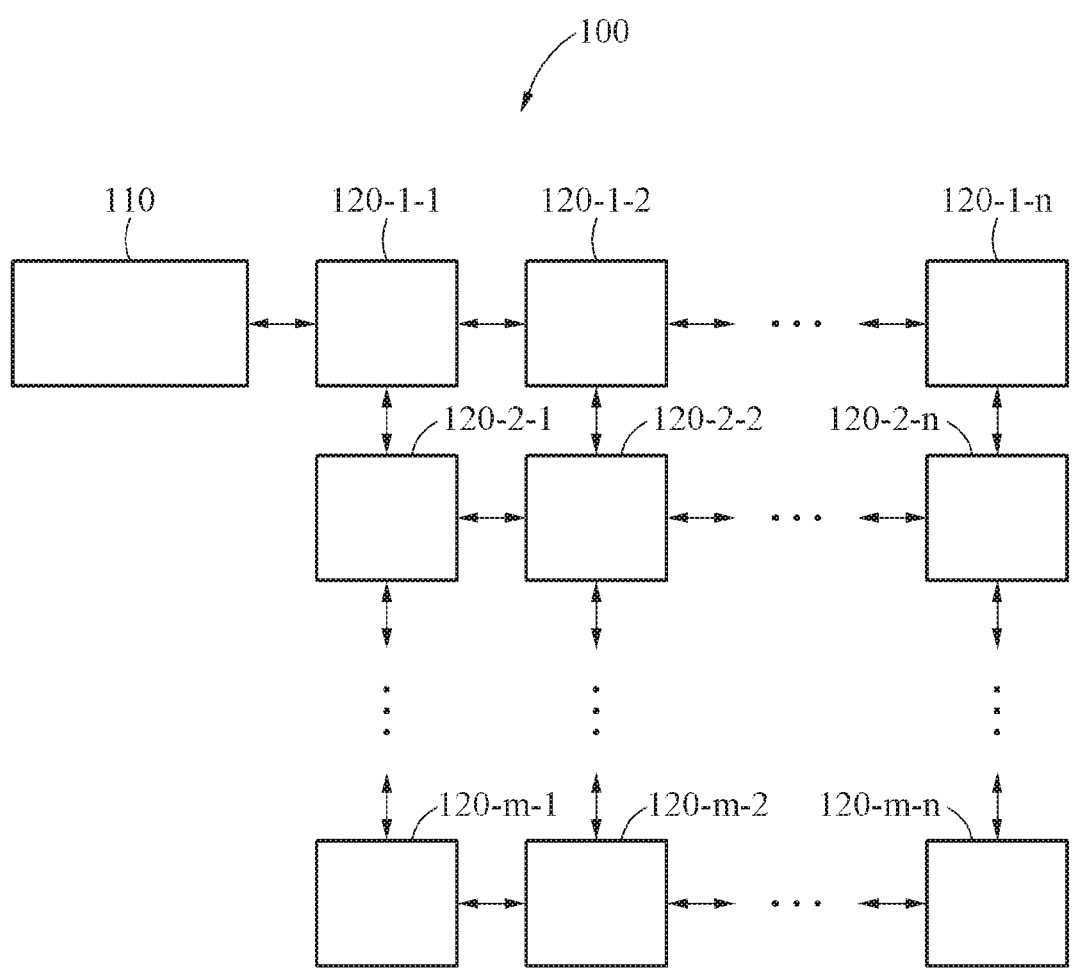
FIG. 1 illustrates an example of a battery management system, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains after an understanding of the disclosure of this application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

FIG. 1 illustrates an example of a battery management system 100.

Referring to FIG. 1, the battery management system 100 includes battery management apparatuses 110 and 120-1-1 through 120-*m-n*.

The battery management apparatus 110 controls the battery management apparatuses 120-1-1 through 120-*m-n*. In the following description, the battery management apparatus 110 is referred to as a "master battery management apparatus" 110, and the battery management apparatuses 120-1-1 through 120-*m-n* are referred to as "slave battery management apparatuses" 120-1-1 through 120-*m-n*.

The slave battery management apparatuses 120-1-1 through 120-*m-n* may be arranged in a form of a grid or a matrix as shown in FIG. 1. Here, the use of the term "may" with respect to an example or embodiment, e.g., as to what an example or embodiment may include or implement, means that at least one example or embodiment exists where such a feature is included or implemented while all examples and embodiments are not limited thereto.

Each of the slave battery management apparatuses 120-1-1 through 120-*m*-*n* is connected to a battery. The battery corresponds to, for example, a battery cell or a battery module.

Each of the slave battery management apparatuses 120-1-1 through 120-*m*-*n* may set an address, or an identifier to identify each individual slave battery management apparatus 120-1-1 through 120-*m*-*n*. The master battery management apparatus 110 determines whether an address is set for each of the slave battery management apparatuses 120-1-1 through 120-*m*-*n*, and determines whether each of the slave battery management apparatuses 120-1-1 through 120-*m*-*n* is operable, based on a determination result. An example of setting an address of each of the slave battery management apparatuses 120-1-1 through 120-*m*-*n* will be described below with reference to FIGS. 3 through 7.

The master battery management apparatus 110 transmits a synchronization message to a slave battery management apparatus, for example, slave battery management apparatus 120-1-1. The synchronization message spreads to the slave battery management apparatuses 120-1-1 through 120-*m*-*n* via an infrared (IR) communication of each of the slave battery management apparatuses 120-1-1 through 120-*m*-*n*. Thus, the slave battery management apparatuses 120-1-1 through 120-*m*-*n* are synchronized and sense corresponding batteries at the same time, or at a point in time at which the slave battery management apparatuses 120-1-1 through 120-*m*-*n* are synchronized. An example of synchronizing the slave battery management apparatuses 120-1-1 through 120-*m*-*n* will be described below with reference to FIGS. 13 and 14.

The master battery management apparatus 110 collects sensing data of each of the slave battery management apparatuses 120-1-1 through 120-*m*-*n*. An example of collecting sensing data will be described below with reference to FIGS. 15 through 19.

Figure 2:
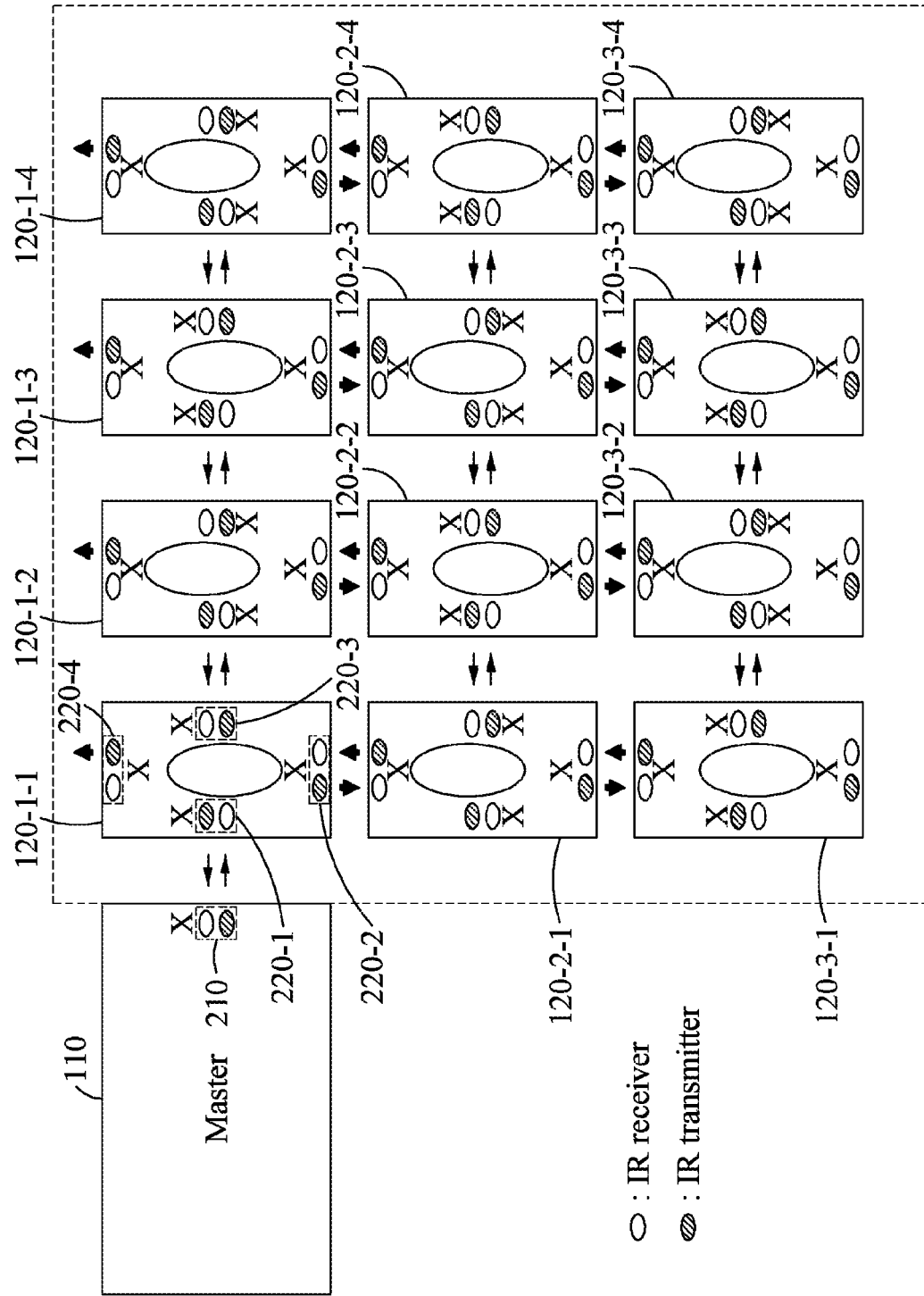
FIG. 2 illustrates an example of an initialization stage of a battery management system, in accordance with one or more embodiments.

FIG. 2 illustrates an example of an initialization stage of a battery management system in accordance with one or more embodiments.

Referring to FIG. 2, a master battery management apparatus 110 includes an IR communicator 210, and each of slave battery management apparatuses 120-1-1 through 120-3-4 includes a plurality of IR communicators. An IR communicator includes an IR receiver and an IR transmitter. Each of the IR receiver and the IR transmitter may include, for example, an infrared light emitting diode (LED).

In FIG. 2, an "X" mark is depicted near the IR communicator 210 of the master battery management apparatus 110, and an "X" mark is depicted near each of the IR communicators of the slave battery management apparatuses 120-1-1 through 120-3-4. The "X" mark indicates that an identifier, for example, a name, of an IR communicator is not assigned. For example, in FIG. 2, an identifier is not assigned to the IR communicator 210 of the master battery management apparatus 110, and IR communicators of each of the slave battery management apparatuses 120-1-1 through 120-3-4. Additionally, an address or an identifier is not assigned to each of the slave battery management apparatuses 120-1-1 through 120-3-4.

The master battery management apparatus 110 performs an initialization process. In an example, the master battery management apparatus 110 determines a status of the IR communicator 210. In an example of FIG. 2, the master battery management apparatus 110 outputs infrared rays using a transmitter of the IR communicator 210. When infrared rays are received by a receiver of the IR communicator 210, the master battery management apparatus 110 may verify that a device facing the IR communicator 210 exists, and may determine that the IR communicator 210 is active based on a verification result. In another example, unlike the example of FIG. 2, the master battery management apparatus 110 may output infrared rays using the IR communicator 210, but may not receive infrared rays from the slave battery management apparatuses 120-1-1 through 120-3-4. In this example, the master battery management apparatus 110 may verify that a device facing the IR communicator 210 does not exist and determine that the IR communicator 210 is inactive based on a verification result.

Each of the slave battery management apparatuses 120-1-1 through 120-3-4 performs an initialization. In an example, each of the slave battery management apparatuses 120-1-1 through 120-3-4 determines a status of each of the IR communicators of the slave battery management apparatuses 120-1-1 through 120-3-4. In the example of FIG. 2, the slave battery management apparatus 120-1-1 outputs infrared rays using IR communicators 220-1 through 220-4. The slave battery management apparatus 120-1-1 may not receive infrared rays using the IR communicator 220-4, since, for example, a slave battery management apparatus is not facing the IR communicator 220-4, and may receive infrared rays using the IR communicators 220-1 through 220-3. In this example, the slave battery management apparatus 120-1-1 may verify that a device facing the IR communicator 220-4 does not exist and that a device facing each of the IR communicators 220-1 through 220-3 exists. The slave battery management apparatus 120-1-1 may determine that the IR communicators 220-1 through 220-3 are active and that the IR communicator 220-4 is inactive, based on a verification result. Similarly, each of slave battery management apparatuses 120-1-2 through 120-3-4 other than the slave battery management apparatus 120-1-1 determines whether each of its own IR communicators is active.

After an initialization stage has been performed, an identification stage may subsequently be performed. This is only an example, and the initialization stage and the identification stage may be performed simultaneously.

In the identification stage, an identifier is assigned to each of the IR communicators of each of the slave battery management apparatuses 120-1-1 through 120-3-4, and an address is assigned to each of the slave battery management apparatuses 120-1-1 through 120-3-4, which will be further described below with reference to FIGS. 3 through 11.

FIGS. 3 through 7 illustrate an example of an identification stage of a battery management system in accordance with one or more embodiments.

Figure 3:
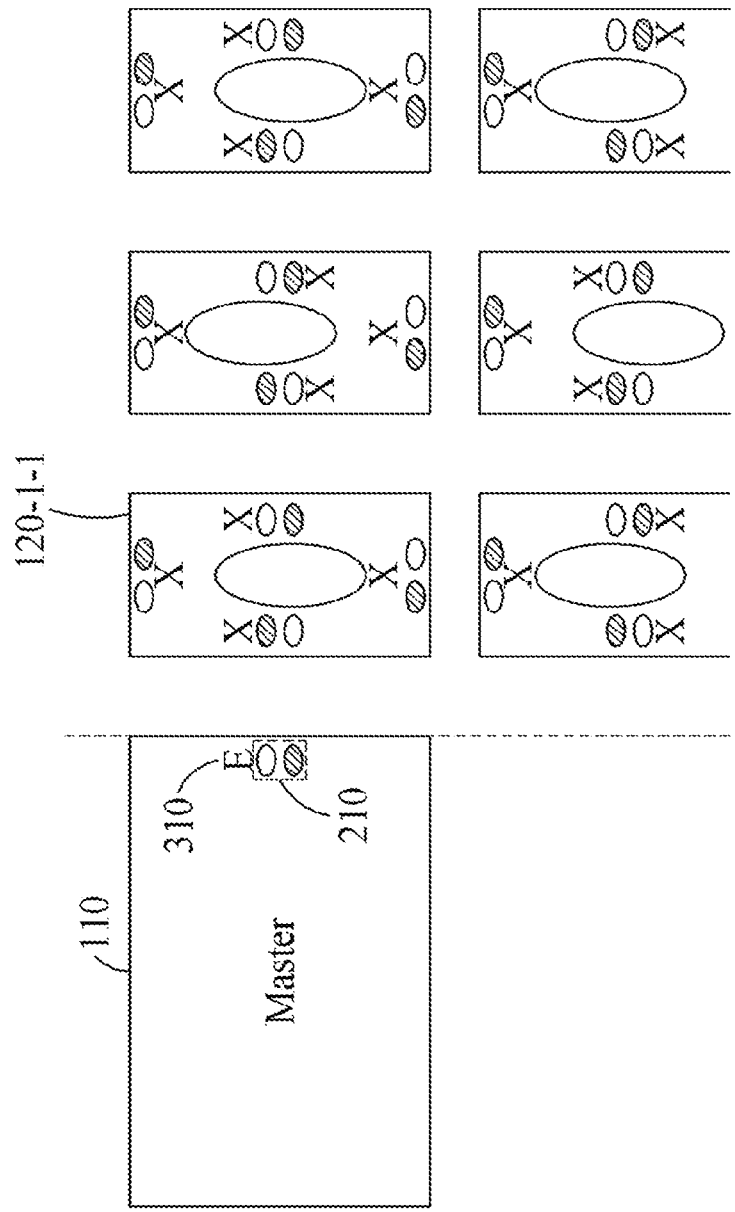
FIGS. 3 through 7 illustrate an example of an identification stage of a battery management system, in accordance with one or more embodiments.

Referring to FIG. 3. the identification stage includes a plurality of steps. When the plurality of steps are performed, an identifier may be set to an IR communicator 210 of a master battery management apparatus 110, an identifier may be set for each of the IR communicators of each of the slave battery management apparatuses 120-1-1 through 120-3-4, and an address may be set for each of the slave battery management apparatuses 120-1-1 through 120-3-4.

Figure 4:
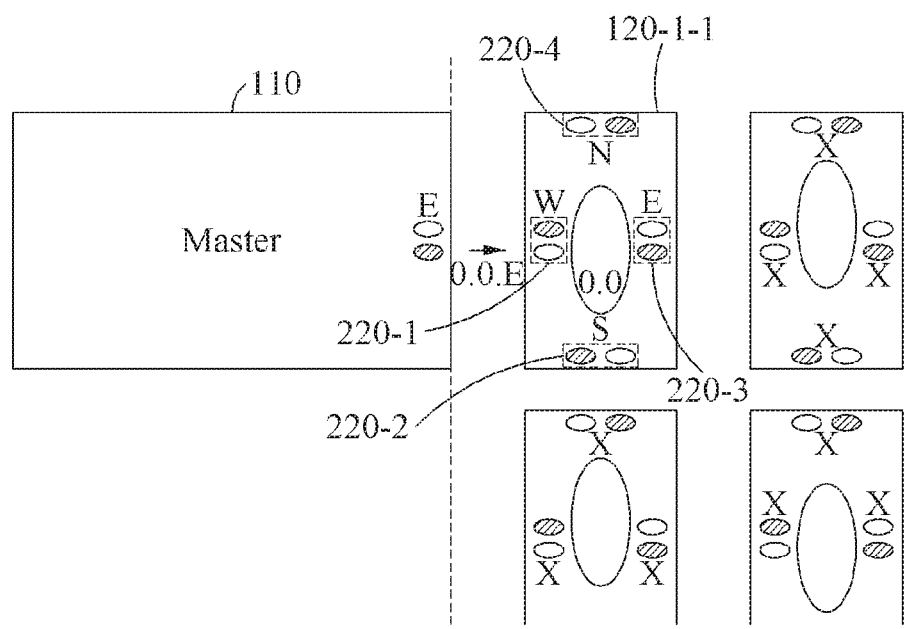

A first step of the identification stage is described with reference to FIGS. 3 and 4.

The master battery management apparatus 110 sets an identifier of the IR communicator 210. In an example, the IR communicator 210 is in a right side as shown in FIG. 3, the master battery management apparatus 110 names the identifier of the IR communicator 210 as "E" 310. In this example, "E" stands for Eastern.

The master battery management apparatus 110 determines an address of the slave battery management apparatus 120-1-1 that faces the IR communicator 210. In an example, the master battery management apparatus 110 determines a row address and a column address of the slave battery management apparatus 120-1-1. The master battery management apparatus 110 transmits, to the slave battery management apparatus 120-1-1, an address assignment message that includes the identifier of the IR communicator 210 and the address of the slave battery management apparatus 120-1-1. In an example of FIG. 4, the master battery management apparatus 110 sets each of the row address and the column address of the slave battery management apparatus 120-1-1 to "0", and transmits, to the slave battery management apparatus 120-1-1, an address assignment message "0.0.E" that includes the set row address "0", the set column address "0", and the identifier "E" of the IR communicator 210.

The slave battery management apparatus 120-1-1 sets its own address based on the address assignment message "0.0.E" received from the master battery management apparatus 110. As shown in FIG. 4, the slave battery management apparatus 120-1-1 sets each of the row address and the column address of the slave battery management apparatus 120-1-1 to "0". For example, when the address is set, the slave battery management apparatus 120-1-1 transmits an acknowledgement message to the master battery management apparatus 110. The acknowledgement message will be further described below.

Also, the slave battery management apparatus 120-1-1 sets an identifier for each of the IR communicators 220-1 through 220-4 of the slave battery management apparatus 120-1-1 based on the address assignment message "0.0.E". In an example, the address assignment message "0.0.E" is received using the IR communicator 220-1, and accordingly the slave battery management apparatus 120-1-1 names the IR communicator 220-1 as "W". In other words, since the name or identifier of the IR communicator 210 transmitting the address assignment message "0.0.E" is "E", the slave battery management apparatus 120-1-1 may name the IR communicator 220-1 receiving the address assignment message "0.0.E" as "W". Additionally, the slave battery management apparatus 120-1-1 may name the IR communicator 220-2 as "S" and may name the IR communicator 220-3 as "E". The slave battery management apparatus 120-1-1 may name the IR communicator 220-4 as "N" even though the IR communicator 220-4 is inactive. Depending on examples, the slave battery management apparatus 120-1-1 may not name the IR communicator 220-4 that is inactive. The identifiers "E", "W", "N", and "S" are only examples, and other identifiers may be implemented.

A second step of the identification stage is described with reference to FIG. 5.

Figure 5:
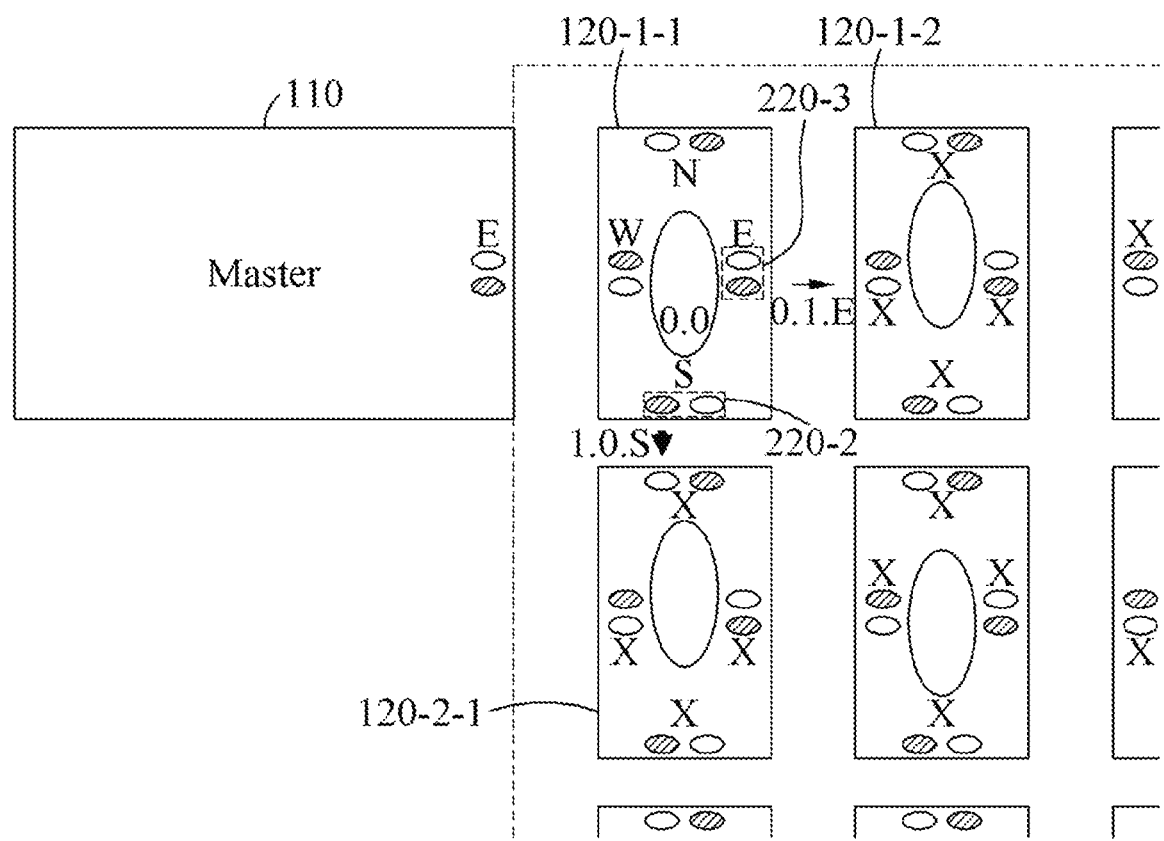

Referring to FIG. 5, the slave battery management apparatus 120-1-1 transmits an address assignment message "1.0.S" to a slave battery management apparatus 120-2-1 using the IR communicator 220-2 that is not used to receive the address assignment message "0.0.E" among the active IR communicators 220-1 through 220-3. In the address assignment message "1.0.S", "1" indicates a row address of the slave battery management apparatus 120-2-1. The row address of the slave battery management apparatus 120-2-1 is obtained by increasing the row address of the slave battery management apparatus 120-1-1 by "1". Also, in the address assignment message "1.0.S", "0" indicates a column address of the slave battery management apparatus 120-2-1 and is identical to the column address of the slave battery management apparatus 120-1-1. In the address assignment message "1.0.S", "S" indicates an identifier of the IR communicator 220-2 of the slave battery management apparatus 120-1-1.

Additionally, the slave battery management apparatus 120-1-1 transmits an address assignment message "0.1.E" to the slave battery management apparatus 120-1-2 using the IR communicator 220-3 that is not used to receive the address assignment message "0.0.E". In the address assignment message "0.1.E", "0" indicates a row address of the slave battery management apparatus 120-1-2 and is identical to the row address of the slave battery management apparatus 120-1-1. In the address assignment message "0.1.E", "1" indicates a column address of the slave battery management apparatus 120-1-2. The column address of the slave battery management apparatus 120-1-2 is obtained by increasing the column address of the slave battery management apparatus 120-1-1 by "1". In the address assignment message "0.1.E", "E" indicates an identifier of the IR communicator 220-3 of the slave battery management apparatus 120-1-1.

Similarly, the slave battery management apparatus 120-2-1 sets an identifier of each of IR communicators and an address "1.0" of the slave battery management apparatus 120-2-1 based on the address assignment message "1.0.5". Also, the slave battery management apparatus 120-1-2 sets an identifier of each of the IR communicators of the slave battery management apparatus 120-1-2, and an address "0.1" of the slave battery management apparatus 120-1-2 based on the address assignment message "0.1.E".

Figure 6:
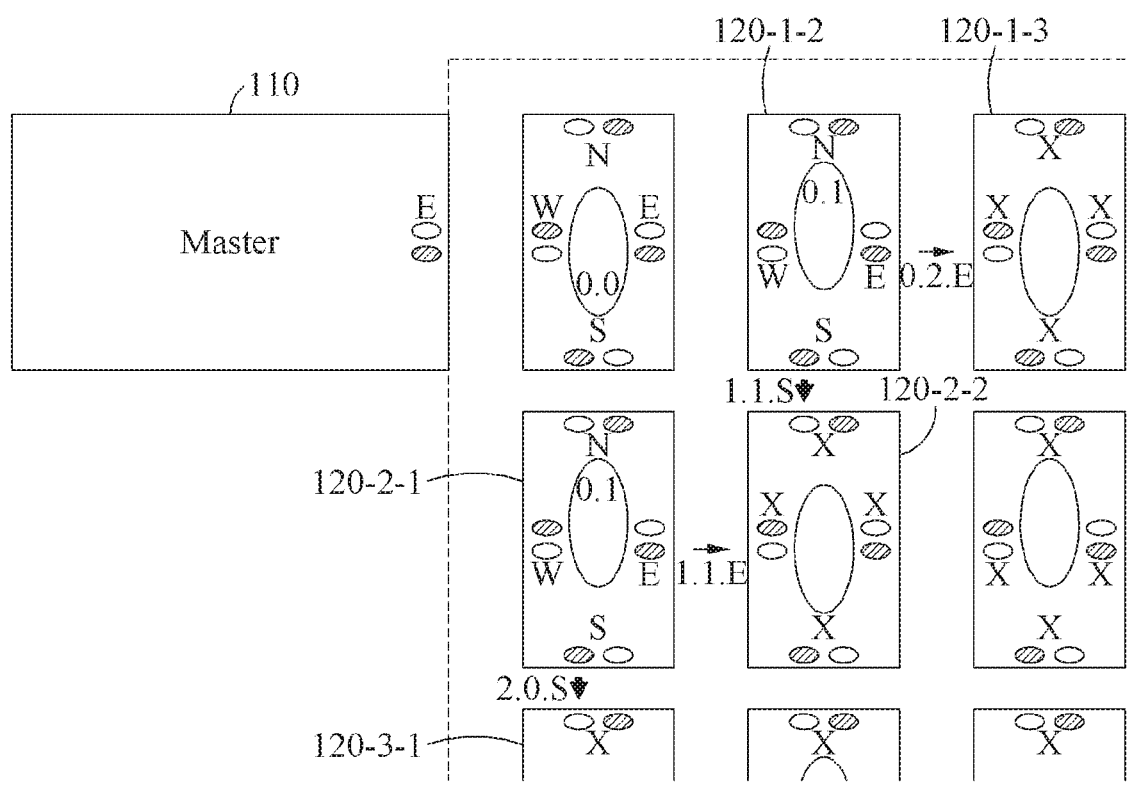

A third step of the identification stage is described with reference to FIG. 6.

The slave battery management apparatus 120-2-1 transmits an address assignment message "2.0.S" to a slave battery management apparatus 120-3-1, and transmits an address assignment message "1.1.E" to a slave battery management apparatus 120-2-2. Additionally, the slave battery management apparatus 120-1-2 transmits an address assignment message "0.2.E" to a slave battery management apparatus 120-1-3, and transmits an address assignment message "1.1.S" to the slave battery management apparatus 120-2-2.

The slave battery management apparatus 120-2-2 receives the address assignment messages "1.1.E" and "1.1.S". The slave battery management apparatus 120-2-2 may set its own address to "1.1" based on an address assignment message that is received first among the address assignment messages "1.1.E" and "1.1.S", and may ignore an address assignment message that is received later. Depending on examples, when the address assignment messages "1.1.E" and "1.1.S" are received at the same time, the slave battery management apparatus 120-2-2 may set the address "1.1" based on one of the address assignment messages "1.1.E" and "1.1.S" and may ignore the other address assignment message.

A portion of the slave battery management apparatuses, for example, the slave battery management apparatus 120-2-2, may simultaneously or sequentially receive a plurality of address assignment messages in the identification stage. When an address is set based on one of the plurality of address assignment messages, the other address assignment messages may be ignored.

In steps subsequent to the third step of the identification stage, each of the other slave battery management apparatuses may set an address and may name IR communicators.

Figure 7:
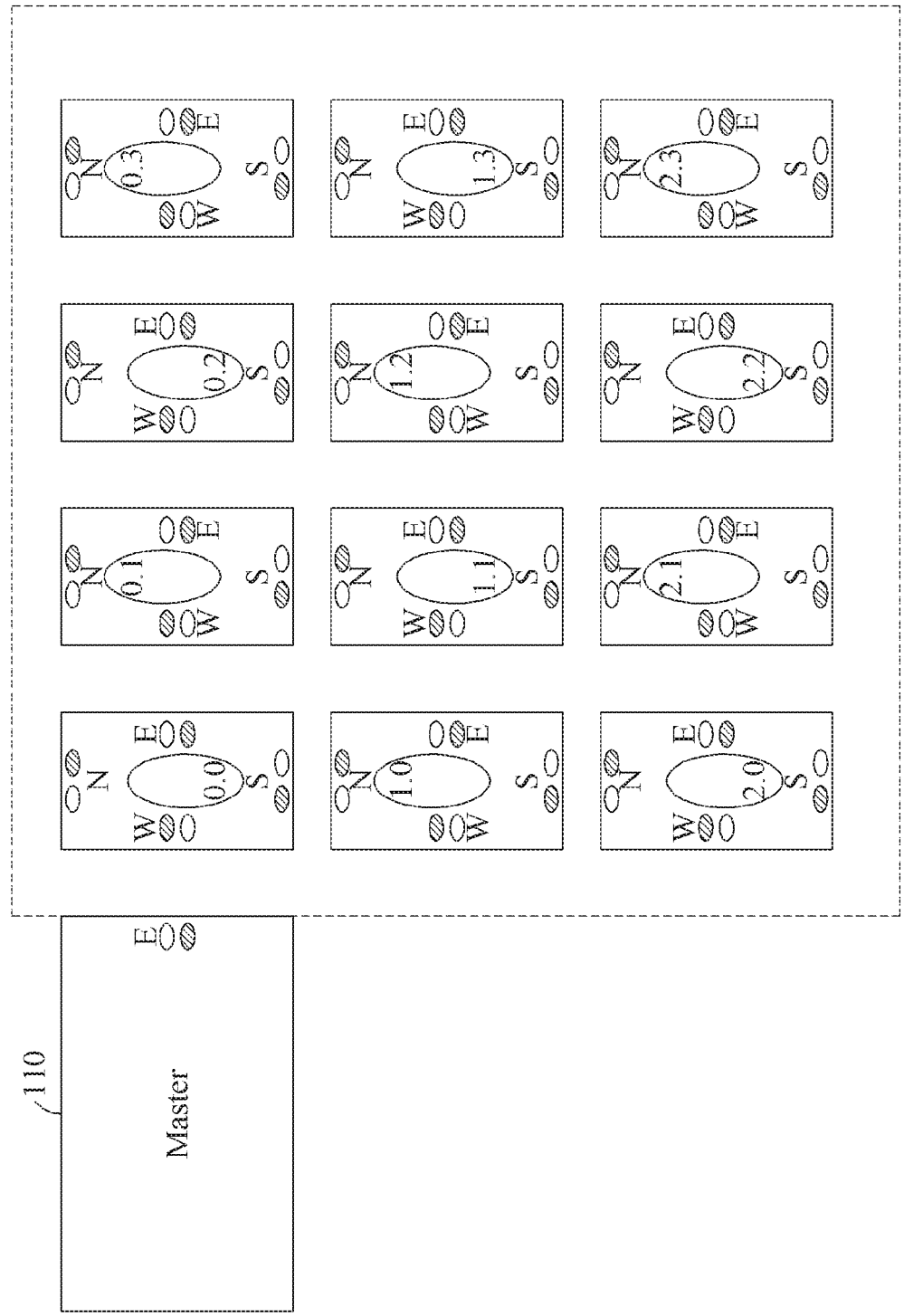

As shown in FIG. 7, after the identification stage has been performed, an address of each of the slave battery management apparatuses 120-1-1 through 120-3-4 is set, and an identifier of each of the IR communicators in each of the slave battery management apparatuses 120-1-1 through 120-3-4 is set.

FIGS. 8 through 11 illustrate examples of a transmission and a reception of an acknowledgement message.

Figure 8:
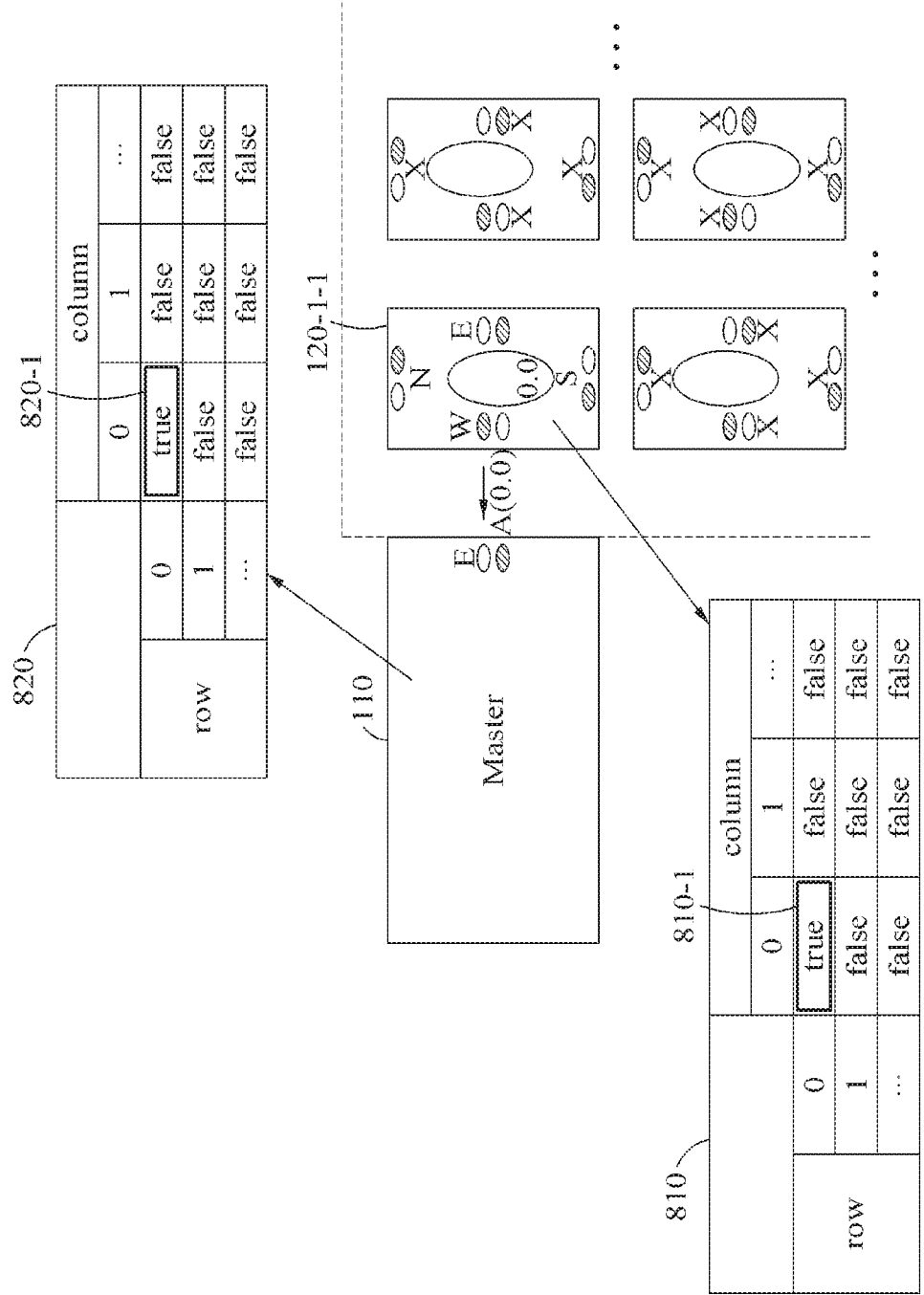
FIGS. 8 through 11 illustrate examples of a transmission and a reception of an acknowledgement message, in accordance with one or more embodiments.

Referring to FIG. 8, the slave battery management apparatus 120-1-1 transmits an acknowledgement message A(0.0) corresponding to the address assignment message "0.0.E" (FIG. 4) to the master battery management apparatus 110. The acknowledgement message A(0.0) includes an address "0.0" of the slave battery management apparatus 120-1-1.

When the acknowledgement message A(0.0) is transmitted to the master battery management apparatus 110, the slave battery management apparatus 120-1-1 updates a message transmission table 810. In an example, as shown in FIG. 8, the slave battery management apparatus 120-1-1 updates an item 810-1 corresponding to the address of the slave battery management apparatus 120-1-1 among items of the message transmission table 810, to true.

When the acknowledgement message A(0.0) is received from the slave battery management apparatus 120-1-1 the master battery management apparatus 110 updates an acknowledgement table 820. In an example, as shown in FIG. 8, the master battery management apparatus 110 updates an item 820-1 corresponding to an address of the slave battery management apparatus 120-1-1 among items of the acknowledgement table 820, to true.

Figure 9:
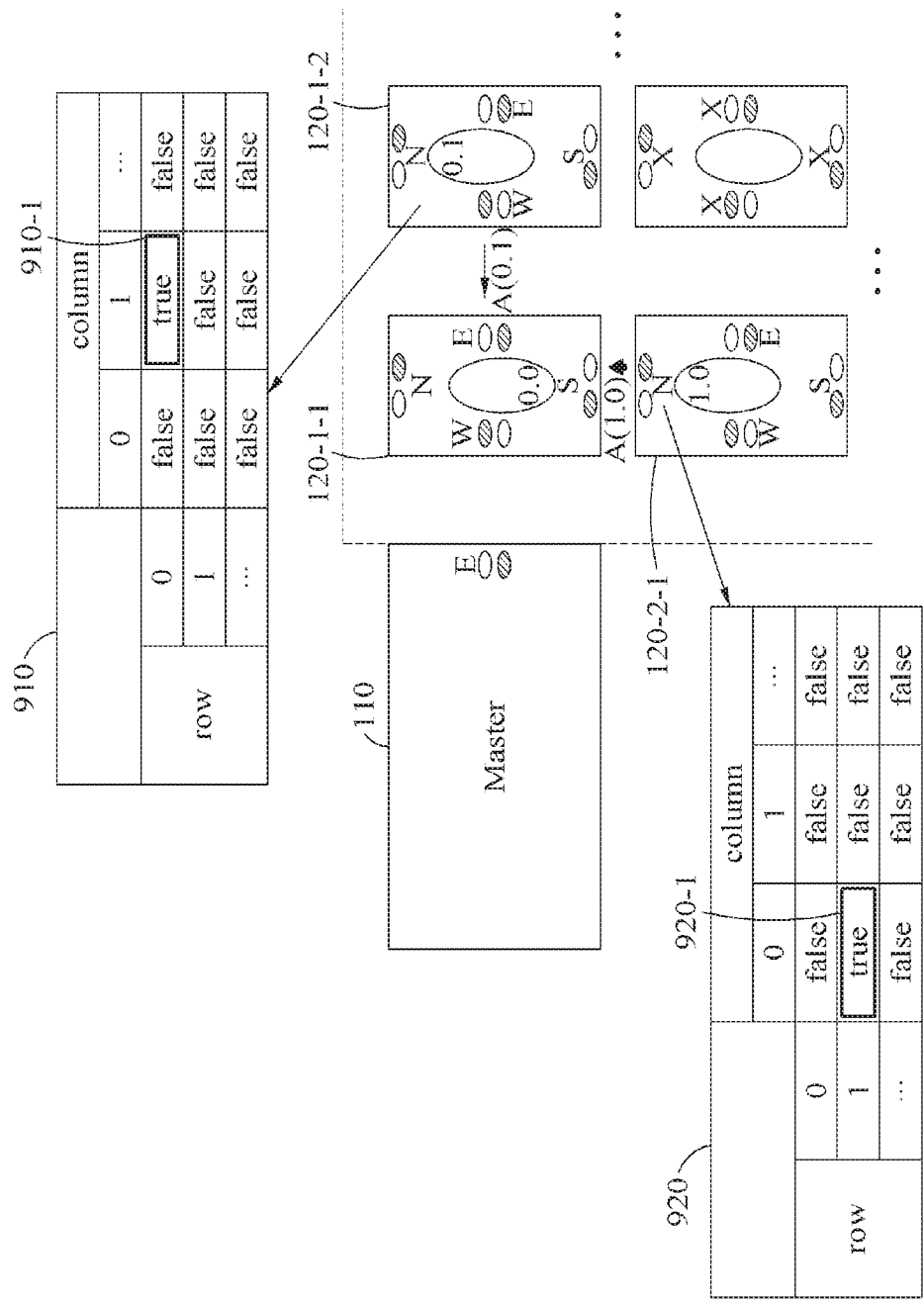

Referring to FIG. 9, the slave battery management apparatus 120-2-1 transmits an acknowledgement message A(1.0) corresponding to the address assignment message "1.0.S" to the slave battery management apparatus 120-1-1, and the slave battery management apparatus 120-1-2 transmits an acknowledgement message A(0.1) corresponding to the address assignment message "0.1.E" to the slave battery management apparatus 120-1-1.

When the acknowledgement message A(0.1) is transmitted, the slave battery management apparatus 120-1-2 updates a message transmission table 910. In an example, as shown in FIG. 9, the slave battery management apparatus 120-1-2 updates an item 910-1 corresponding to an address of the slave battery management apparatus 120-1-2 among items of the message transmission table 910, to true.

When the acknowledgement message A(1.0) is transmitted, the slave battery management apparatus 120-2-1 updates a message transmission table 920. In an example, as shown in FIG. 9, the slave battery management apparatus 120-2-1 updates an item 920-1 corresponding to an address of the slave battery management apparatus 120-2-1 among items of the message transmission table 920, to true.

The slave battery management apparatus 120-1-1 receives the acknowledgement messages A(0.1) and A(1.0), and stores the acknowledgement messages A(0.1) and A(1.0) in a queue.

Figure 10:
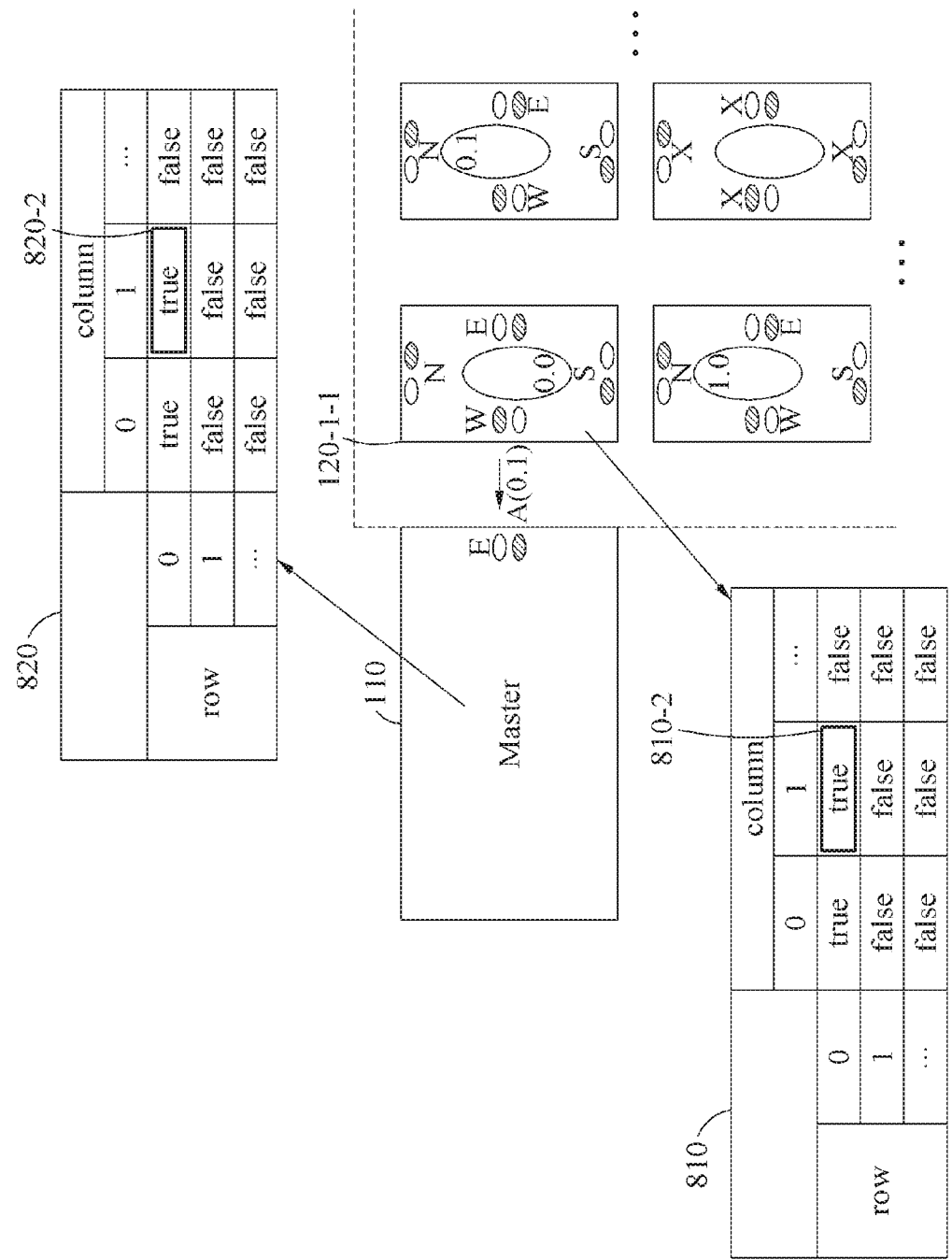

Referring to FIG. 10, the slave battery management apparatus 120-1-1 transmits the acknowledgement message A(0.1) stored in the queue to the master battery management apparatus 110.

When the acknowledgement message A(0.1) is transmitted to the master battery management apparatus 110, the slave battery management apparatus 120-1-1 updates the message transmission table 810. In an example, as shown in FIG. 10, the slave battery management apparatus 120-1-1 updates an item 810-2, to true.

When the acknowledgement message A(0.1) is received, the master battery management apparatus 110 updates the acknowledgement table 820. In an example, as shown in FIG. 10, the master battery management apparatus 110 updates an item 820-2 to true.

Figure 11:
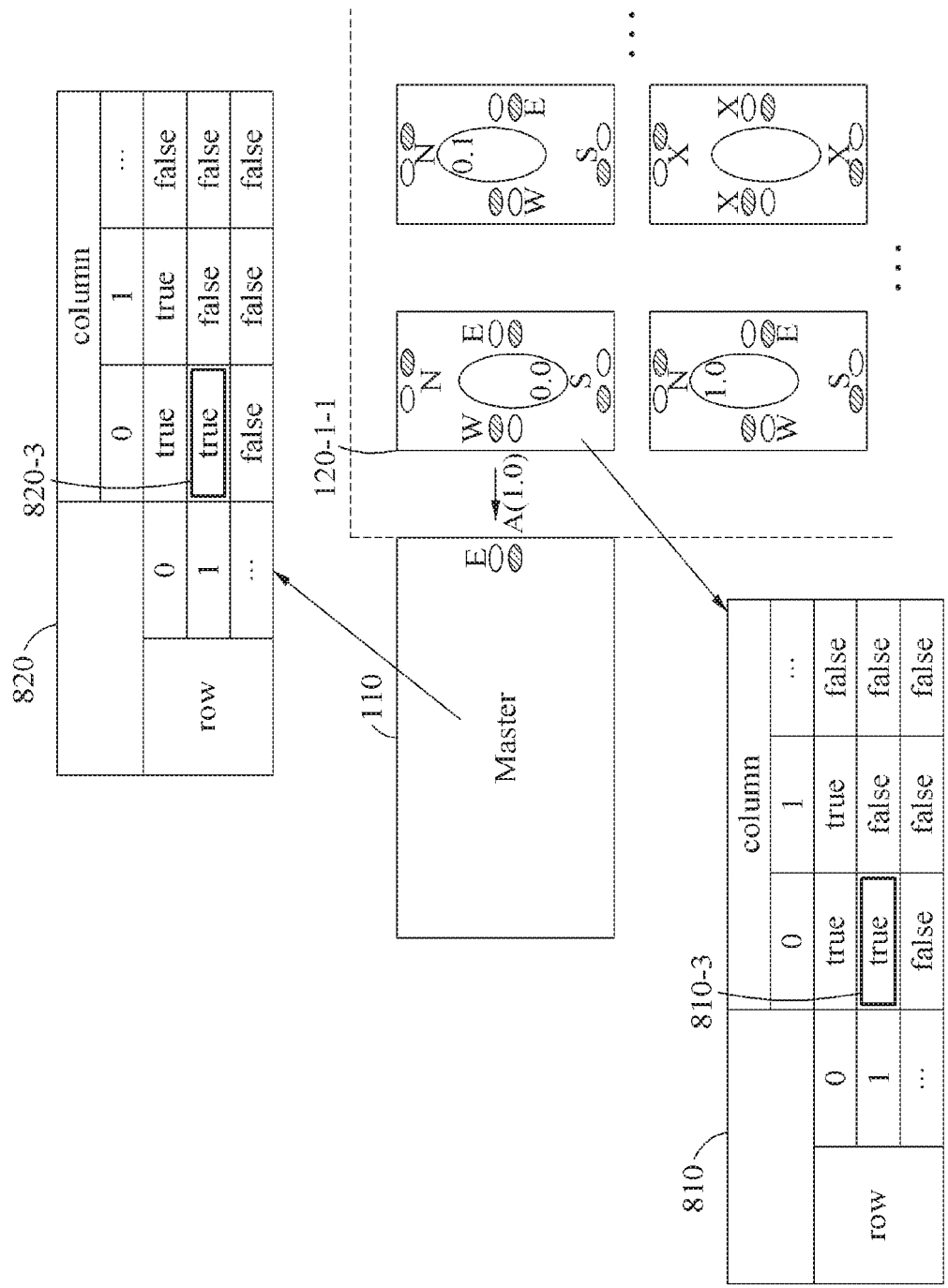

Referring to FIG. 11, the slave battery management apparatus 120-1-1 transmits the acknowledgement message A(1.0) stored in the queue to the master battery management apparatus 110.

When the acknowledgement message A(1.0) is transmitted to the master battery management apparatus 110, the slave battery management apparatus 120-1-1 updates the message transmission table 810. In an example, as shown in FIG. 11, the slave battery management apparatus 120-1-1 updates an item 810-3, to true.

When the acknowledgement message A(1.0) is received, the master battery management apparatus 110 updates the acknowledgement table 820. In an example, as shown in FIG. 11, the master battery management apparatus 110 updates an item 820-3, to true.

The master battery management apparatus 110 receives an acknowledgement message including an address of each of the other slave battery management apparatuses from the slave battery management apparatus 120-1-1, and updates the acknowledgement table 820 every time the acknowledgement message is received. Thus, items in the acknowledgement table 820 may be updated to true.

The master battery management apparatus 110 determines whether each of the slave battery management apparatuses 120-1-1 through 120-3-4 is operable, based on the updated acknowledgement table 820. In an example, when each of items in the updated acknowledgement table 820 is true, the master battery management apparatus 110 may determine that each of the slave battery management apparatuses 120-1-1 through 120-3-4 is operable. The master battery management apparatus 110 may determine that a slave battery management apparatus corresponding to an item "false" among the items in the updated acknowledgement table 820 is not operable.

Figure 12:
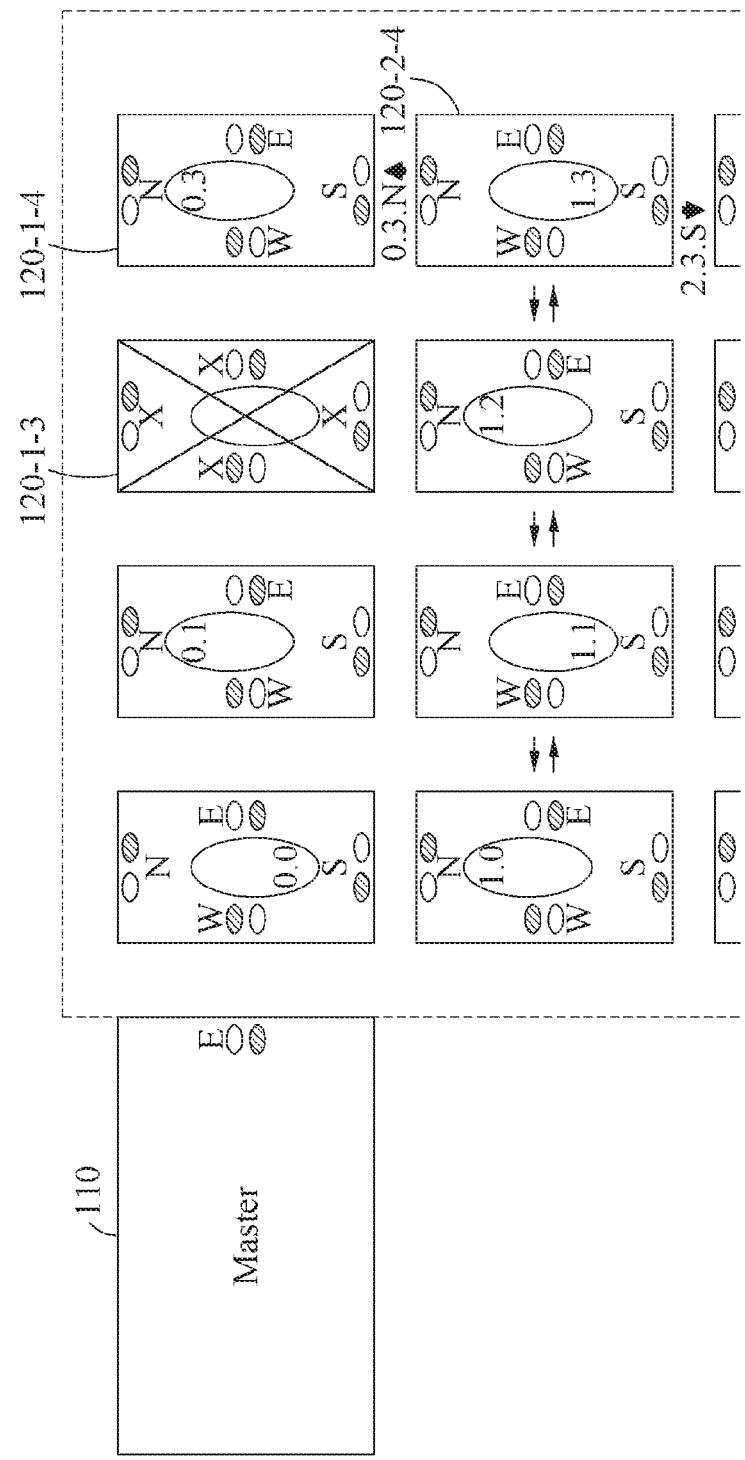
FIG. 12 illustrates an example of an identification stage performed in response to a malfunction of a portion of slave battery management apparatuses in a battery management system, in accordance with one or more embodiments.

FIG. 12 illustrates an example of an identification stage performed in response to a malfunction of a portion or a subset of the slave battery management apparatuses in a battery management system.

Referring to FIG. 12, in an example, the slave battery management apparatus 120-1-3 malfunctions. In this example, an initialization stage and an identification stage may be performed by bypassing the slave battery management apparatus 120-1-3. For example, a slave battery management apparatus 120-1-4 may not receive an address assignment message from the slave battery management apparatus 120-1-3, but may receive an address assignment message "0.3.N" from a slave battery management apparatus 120-2-4. Thus, the slave battery management apparatus 120-1-4 sets an address to "0.3" based on the address assignment message "0.3.N", and assigns an identifier to each of the IR communicators of the slave battery management apparatus 120-1-4.

When the initialization stage and the identification stage are performed by bypassing the malfunctioning slave battery management apparatus 120-1-3, the master battery management apparatus 110 may not receive an acknowledgement message A(0.2) from the slave battery management apparatus 120-1-3. Accordingly, an item corresponding to (0.2) among the items of the acknowledgement table 820 of the master battery management apparatus 110 may be false. The master battery management apparatus 110 may determine that the slave battery management apparatus 120-1-3 is not operable, and may feed back to a user a notification that the slave battery management apparatus 120-1-3 is not operable.

The battery management system 100 performs the identification stage, to automatically set an address of each of the slave battery management apparatuses 120-1-1 through 120-3-4 and to determine whether all the slave battery management apparatuses 120-1-1 through 120-3-4 are operable, based on the acknowledgement table 820.

Figure 13:
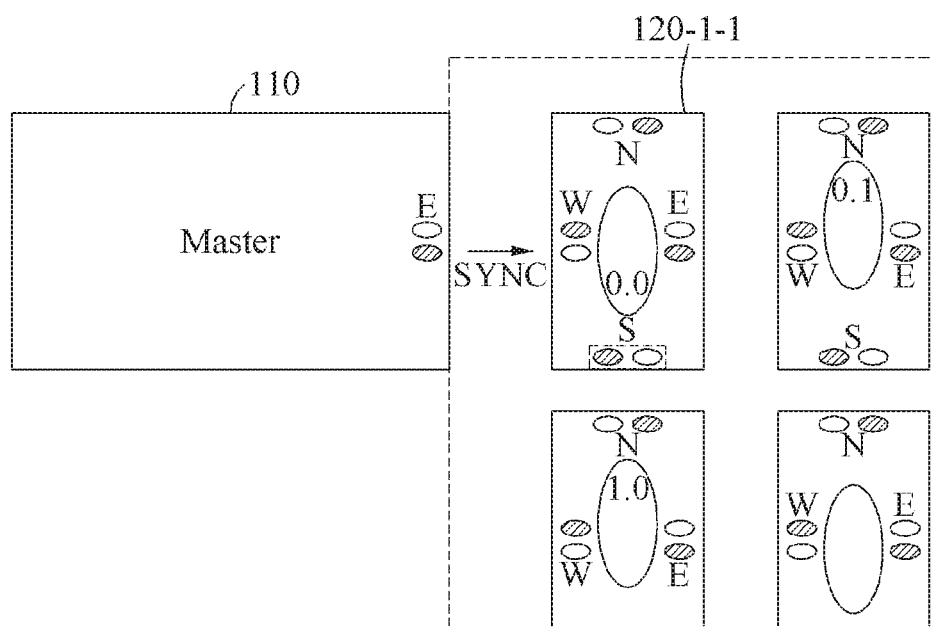
FIGS. 13 and 14 illustrate an example of a synchronization stage of a battery management system, in accordance with one or more embodiments.
Figure 14:
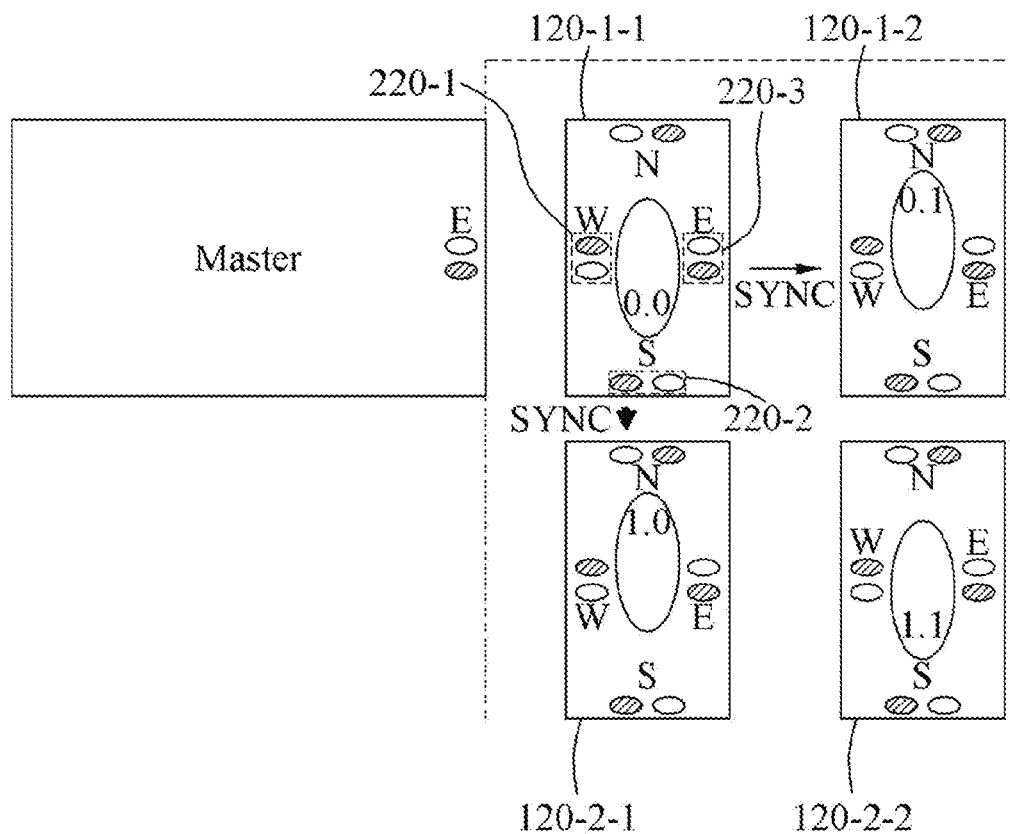

FIGS. 13 and 14 illustrate an example of a synchronization stage of a battery management system in accordance with one or more embodiments.

The synchronization stage may include a plurality of steps. When the plurality of steps are performed, the slave battery management apparatuses 120-1-1 through 120-3-4 are synchronized.

Referring to FIG. 13, in a first step of the synchronization stage, the master battery management apparatus 110 transmits a synchronization message to the slave battery management apparatus 120-1-1.

Referring to FIG. 14, in a second step of the synchronization stage, the slave battery management apparatus 120-1-1 transmits a synchronization message to the slave battery management apparatus 120-2-1 using the IR communicator 220-2 that is not used to receive a synchronization message from the master battery management apparatus 110 among the IR communicators 220-1 through 220-3 that are active, and transmits a synchronization message to the slave battery management apparatus 120-1-2 using the IR communicator 220-3.

In a third step of the synchronization stage, synchronization messages are transmitted to the slave battery management apparatuses 120-1-3, 120-3-1 and 120-2-2. In a fourth step of the synchronization stage, synchronization messages are transmitted to the slave battery management apparatuses 120-1-4, 120-2-3 and 120-3-2 (FIG. 2). In a fifth step of the synchronization stage, synchronization messages are transmitted to the slave battery management apparatuses 120-2-4 and 120-3-3 (FIG. 2). In a sixth step of the synchronization stage, a synchronization message is transmitted to the slave battery management apparatus 120-3-4. Thus, the synchronization messages spread to the slave battery management apparatuses 1201-1 through 120-3-4. The order in which the synchronization messages are transmitted as discussed above is a non-limiting example, and the synchronization messages may be transmitted in a different order depending on examples.

Depending on examples, when a synchronization message is received, each of the slave battery management apparatuses 120-1-1 through 120-3-4 may determine a sensing timing.

In an example, when a synchronization message is received by the slave battery management apparatus 120-1-1, the slave battery management apparatus 120-1-1 determines that five steps remain until the synchronization message spreads to all of the slave management apparatuses, and determines a sensing timing by applying a delay t1 corresponding to a number of remaining steps to a point in time at which the synchronization message is received. When a synchronization message is received by the slave battery management apparatuses 120-1-2 and 120-2-1, each of the slave battery management apparatuses 120-1-2 and 120-2-1 determines that four steps remain until the synchronization message spreads to all of the remaining slave management apparatuses, and determines a sensing timing by applying a delay t2 corresponding to a number of remaining steps to a point in time at which the synchronization message is received. When a synchronization message is received by the slave battery management apparatuses 120-1-3, 120-3-1 and 120-2-2, each of the slave battery management apparatuses 120-1-3, 120-3-1 and 120-2-2 determines that three steps remain until the synchronization message spreads to the remaining slave battery management apparatuses, and determines a sensing timing by applying a delay t3 corresponding to a number of remaining steps to a point in time at which the synchronization message is received. When a synchronization message is received by the slave battery management apparatuses 120-1-4, 120-2-3 and 120-3-2, each of the slave battery management apparatuses 120-1-4, 120-2-3 and 120-3-2 determines that two steps remain until the synchronization message spreads to the remaining slave management apparatuses, and determines a sensing timing by applying a delay t4 corresponding to a number of remaining steps to a point in time at which the synchronization message is received. When a synchronization message is received by the slave battery management apparatuses 120-2-4 and 120-3-3, each of the slave battery management apparatuses 120-2-4 and 120-3-3 determines that one step remains until the synchronization message spreads to the remaining slave management apparatus, and determines a sensing timing by applying a delay t5 corresponding to a number of remaining steps to a point in time at which the synchronization message is received. The slave battery management apparatus 120-3-4 determines a sensing timing by applying a delay t6 to a point in time at which the synchronization message is received. Thus, each of the slave battery management apparatuses 120-1-1 through 120-3-4 may determine the same sensing timing.

Depending on examples, a synchronization message including a sensing timing may spread to the slave battery management apparatuses 120-1-1 through 120-3-4, and each of the slave battery management apparatuses 120-1-1 through 120-3-4 may determine the same sensing timing based on the synchronization message.

Each of the slave battery management apparatuses 120-1-1 through 120-3-4 may sense a corresponding battery at the determined sensing timing. For example, each of the slave battery management apparatuses 120-1-1 through 120-3-4 may sense a corresponding battery at the same timing. Each of the slave battery management apparatuses 120-1-1 through 120-3-4 may store sensing data generated by sensing a corresponding battery in a buffer or a memory. The sensing data may include, as non-limiting examples, any one or any combination of voltage data, current data and temperature data.

FIGS. 15 through 19 illustrate an example of a sensing data collection stage of a battery management system.

The sensing data collection stage may include a plurality of steps. When the plurality of steps are performed, the master battery management apparatus 110 collects sensing data of each of the slave battery management apparatuses 120-1-1 through 120-3-4. A first step of the sensing data collection stage is described below with reference to FIGS. 15 and 16.

Figure 15:
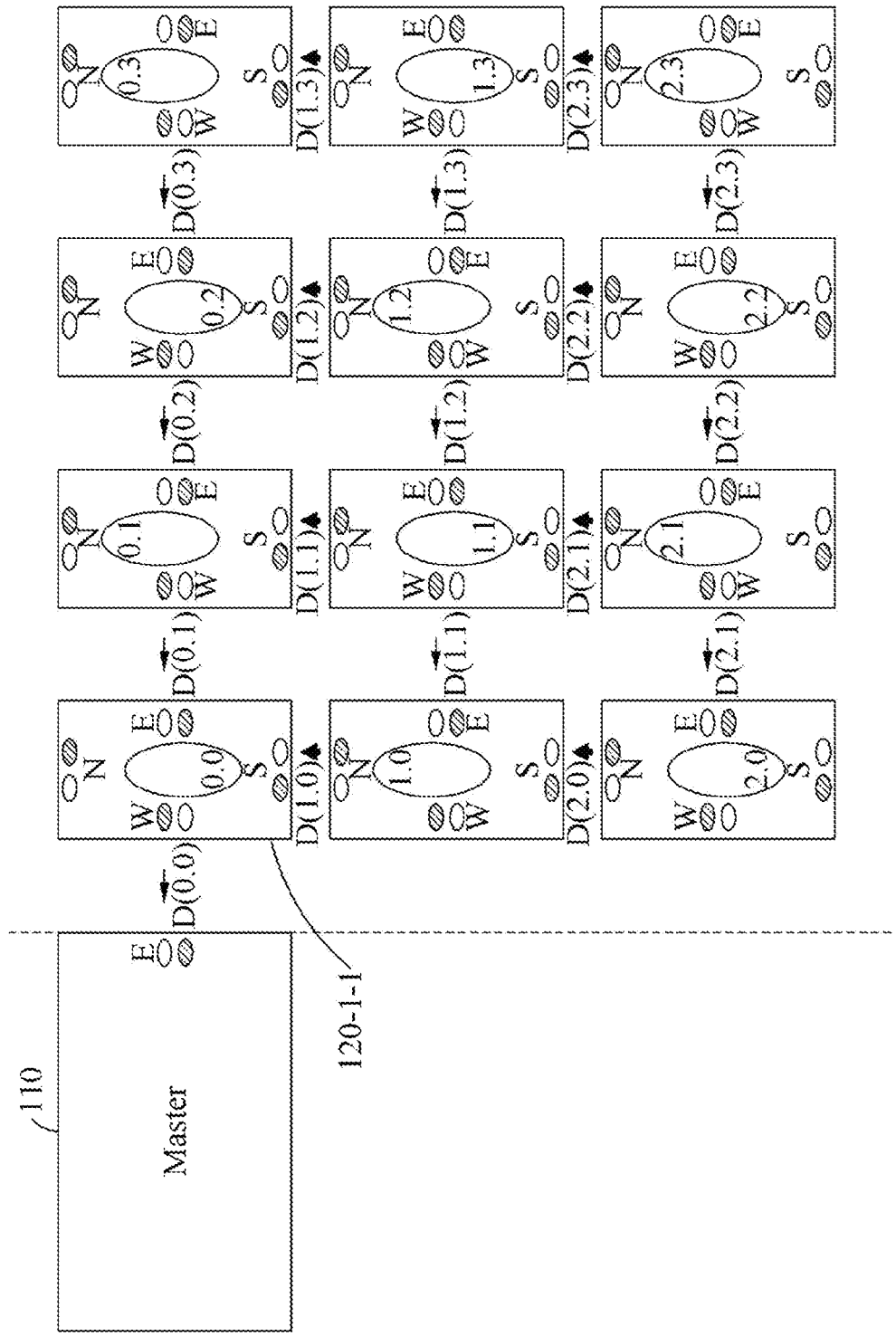
FIGS. 15 through 19 illustrate an example of a sensing data collectionstage of a battery management system, in accordance with one or more embodiments.
Figure 16:
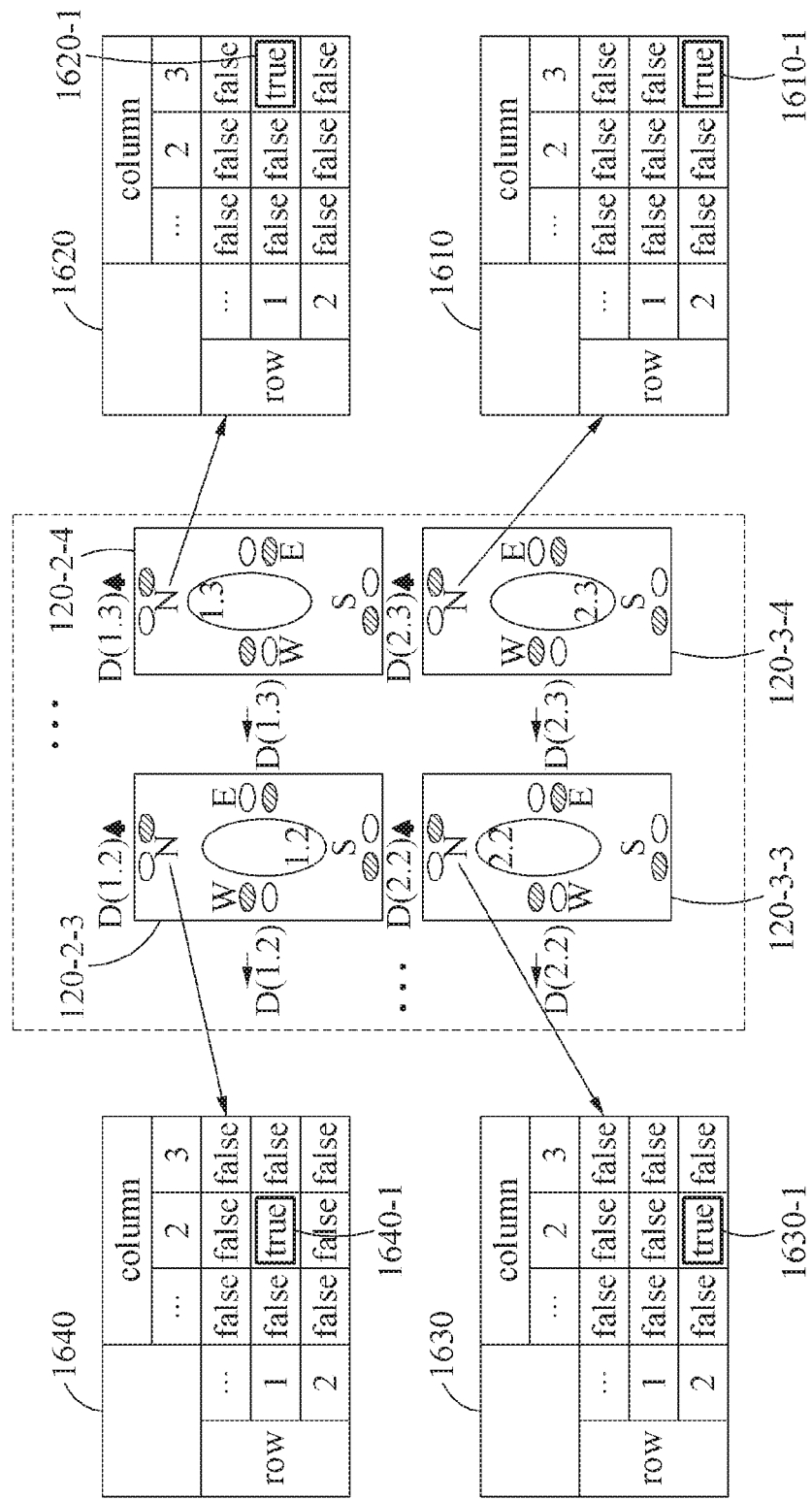

Referring to FIG. 15, the slave battery management apparatus 120-1-1 may transmit sensing data D(0.0) to the master battery management apparatus 110. Also, each of the slave battery management apparatuses other than the slave battery management apparatus 120-1-1 may transmit sensing data to a neighboring slave battery management apparatus. Referring to FIG. 16, the slave battery management apparatus 120-3-4 transmits sensing data D(2.3) to the slave battery management apparatuses 120-3-3 and 120-2-4. The slave battery management apparatus 120-3-4 transmits the sensing data D(2.3) to the slave battery management apparatus 120-3-3 using an active IR communicator "W", and transmits the sensing data D(2.3) to the slave battery management apparatus 120-2-4 using an active IR communicator "N".

When the sensing data D(2.3) is transmitted by the slave battery management apparatus 120-3-4, the slave battery management apparatus 120-3-4 updates a message transmission table 1610. For example, as shown in FIG. 16, the slave battery management apparatus 120-3-4 updates an item 1610-1 corresponding to an address "2.3" of the slave battery management apparatus 120-3-4 among items of the message transmission table 1610, to true.

The slave battery management apparatus 120-2-4 transmits its own sensing data D(1.3) to the slave battery management apparatuses 120-2-3 and 120-1-4 (see FIG. 2). When the sensing data D(1.3) is transmitted by the slave battery management apparatus 120-2-4, the slave battery management apparatus 120-2-4 updates an item 1620-1 in a message transmission table 1620, to true. The slave battery management apparatus 120-2-4 may store the sensing data D(2.3) received from the slave battery management apparatus 120-3-4 in a queue.

The slave battery management apparatus 120-3-3 transmits its own sensing data D(2.2) to the slave battery management apparatuses 120-2-3 and 120-3-2 (see FIG. 2). When the sensing data D(2.2) is transmitted by the slave battery management apparatus 120-3-3, the slave battery management apparatus 120-3-3 updates an item 1630-1 in a message transmission table 1630, to true. The slave battery management apparatus 120-3-3 may store the sensing data D(2.3) received from the slave battery management apparatus 120-3-4 in a queue.

The slave battery management apparatus 120-2-3 transmits its own sensing data D(1.2) to the slave battery management apparatuses 120-2-2 and 120-1-3. When the sensing data D(1.2) is transmitted by the slave battery management apparatus 120-2-3, the slave battery management apparatus 120-2-3 updates an item 1640-1 in a message transmission table 1640 to true. The slave battery management apparatus 120-2-3 may store the sensing data D(2.2) received from the slave battery management apparatus 120-3-3 and the sensing data D(1.3) received from the slave battery management apparatus 120-2-4 in a queue.

Each of slave battery management apparatuses that are not illustrated in FIG. 16 may transmit its own sensing data to a neighboring battery management apparatus using an IR communicator that is not used to receive sensing data among active IR communicators, and may store sensing data received from another neighboring battery management apparatus in a queue.

A second step of the sensing data collection stage is described below with reference to FIG. 17.

Figure 17:
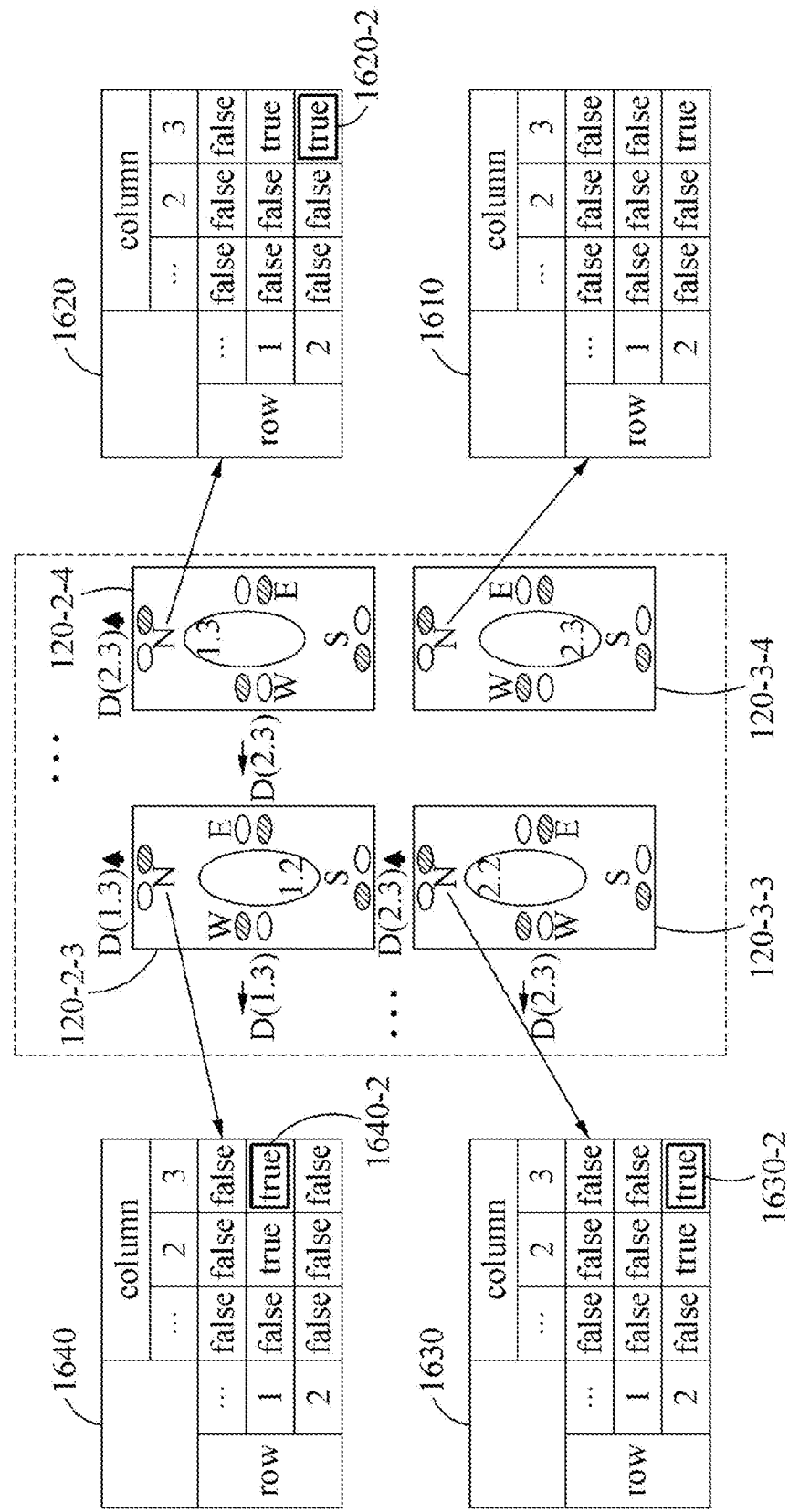

Referring to FIG. 17, the slave battery management apparatus 120-3-4 interrupts a transmission of the sensing data D(2.3).

The slave battery management apparatus 120-2-4 may then transmit the sensing data D(2.3) stored in the queue to the slave battery management apparatuses 120-2-3 and 120-1-4 (see FIG. 2). When the sensing data D(2.3) is transmitted by the slave battery management apparatus 120-2-4, the slave battery management apparatus 120-2-4 updates an item 1620-2 in the message transmission table 1620, to true.

The slave battery management apparatus 120-3-3 transmits the sensing data D(2.3) stored in the queue to the slave battery management apparatuses 120-2-3 and 120-3-2. When the sensing data D(2.3) is transmitted by the slave battery management apparatus 120-3-3, the slave battery management apparatus 120-3-3 updates an item 1630-2 in the message transmission table 1630, to true.

The slave battery management apparatus 120-2-3 transmits the sensing data D(1.3) among the sensing data D(2.2) and D(1.3) stored in the queue to the slave battery management apparatuses 120-2-2 and 120-1-3. When the sensing data D(1.3) is transmitted by the slave battery management apparatus 120-2-3, the slave battery management apparatus 120-2-3 updates an item 1640-2 in the message transmission table 1640 to true. The slave battery management apparatus 120-2-3 may store the sensing data D(2.3) received from the slave battery management apparatus 120-3-3 and the sensing data D(2.3) received from the slave battery management apparatus 120-2-4 in the queue. In other words, the queue of the slave battery management apparatus 120-2-3 may store the sensing data D(2.2) and two pieces of sensing data D(2.3).

Each of slave battery management apparatuses that are not illustrated in FIG. 17 may transmit sensing data stored in its own queue to a neighboring battery management apparatus using an IR communicator that is not used to receive sensing data among active IR communicators.

A third step of the sensing data collection stage is described below with reference to FIG. 18.

Figure 18:
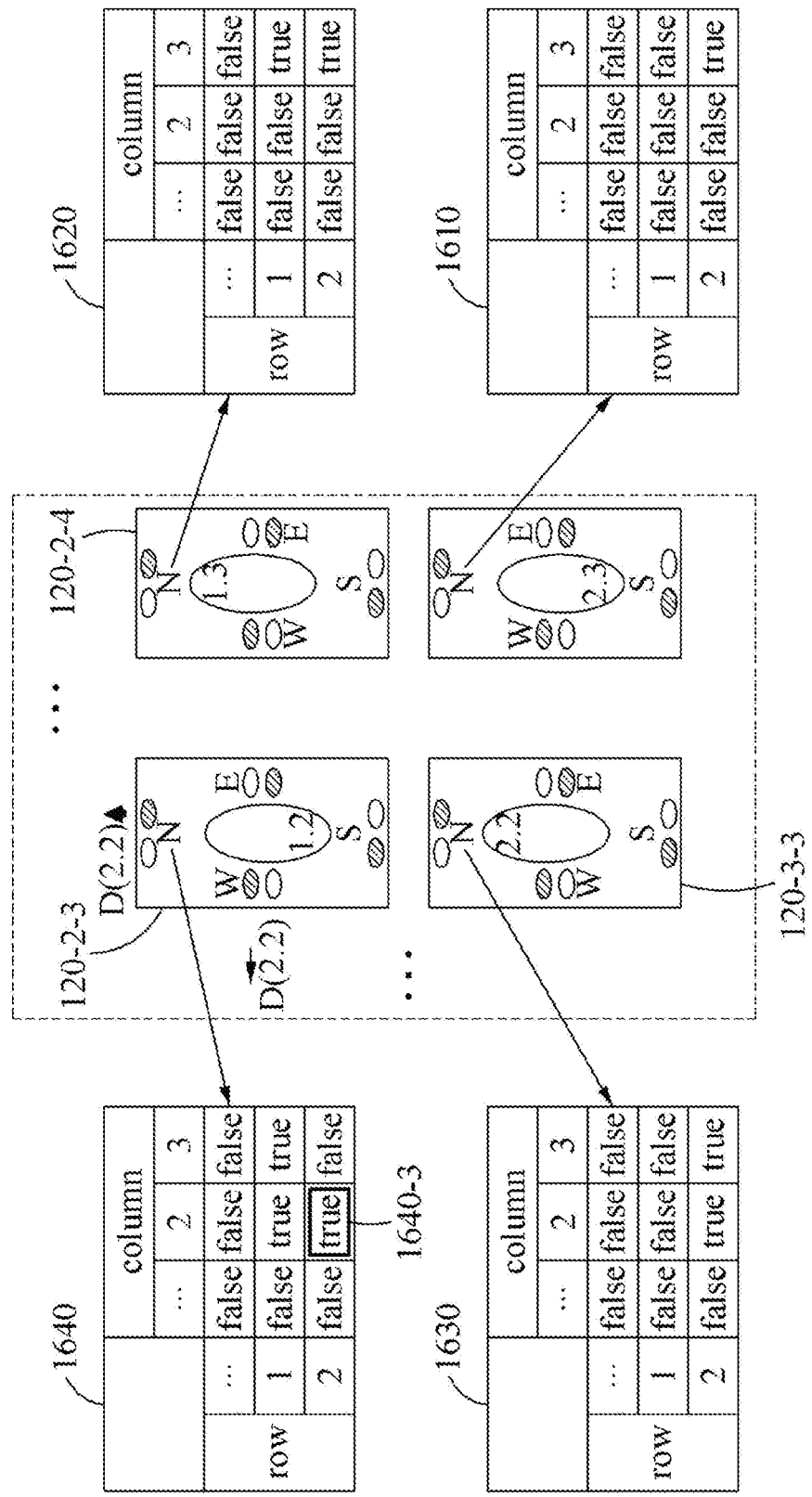

Referring to FIG. 18, the slave battery management apparatus 120-3-3 interrupts a transmission of the sensing data D(2.2), and the slave battery management apparatus 120-2-4 interrupts a transmission of the sensing data D(1.3).

The slave battery management apparatus 120-2-3 transmits the sensing data D(2.2) stored in the queue to the slave battery management apparatuses 120-2-2 and 120-1-3 (see FIG. 2). When the sensing data D(2.2) is transmitted, the slave battery management apparatus 120-2-3 may update an item 1640-3 in the message transmission table 1640, to true.

Each of slave battery management apparatuses that are not illustrated in FIG. 18 may transmit sensing data stored in its own queue to a neighboring battery management apparatus using an IR communicator that is not used to receive sensing data among active IR communicators.

A fourth step of the sensing data collection stage is described below with reference to FIG. 19.

Figure 19:
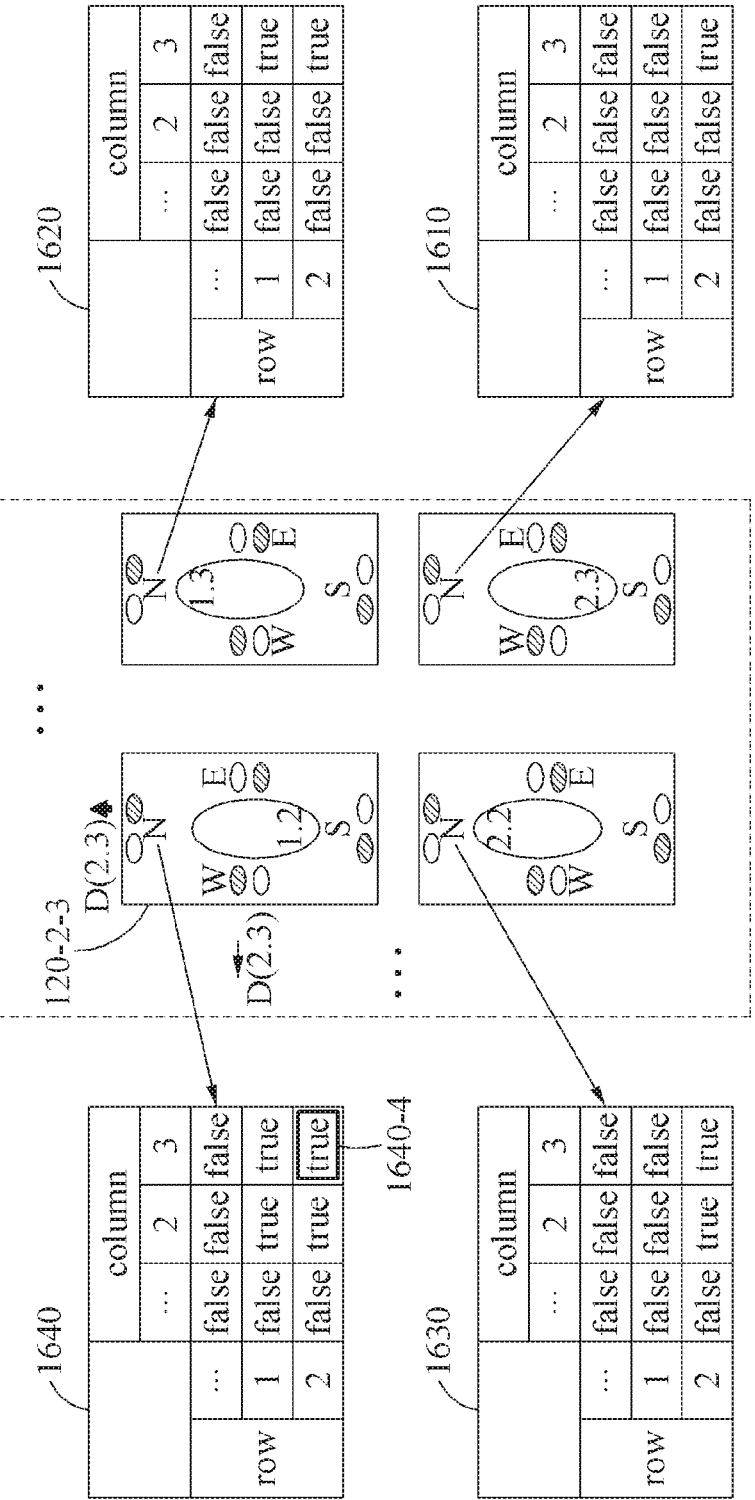

Referring to FIG. 19, slave battery management apparatus 120-2-3 transmits the sensing data D(2.3) stored in the queue to the slave battery management apparatuses 120-2-2 and 120-1-3 (see FIG. 2). When the sensing data D(2.3) is transmitted, the slave battery management apparatus 120-2-3 updates an item 1640-4 in the message transmission table 1640 to true.

Similarly, each of the other slave battery management apparatuses may transmit sensing data stored in its own queue to a neighboring battery management apparatus using an IR communicator that is not used to receive sensing data among active IR communicators.

In the queue of the slave battery management apparatus 120-2-3, the sensing data D(2.3) is still stored. Since the item 1640-4 in the message transmission table 1640 is true, the slave battery management apparatus 120-2-3 ignores the sensing data D(2.3) instead of transmitting the sensing data D(2.3) to the slave battery management apparatuses 120-2-2 and 120-1-3 in a fifth step of the sensing data collection stage.

In the fifth step and a subsequent step of the sensing data collection stage, each of the other slave battery management apparatuses may transmit sensing data stored in its own queue to a neighboring battery management apparatus using an IR communicator that is not used to receive sensing data among active IR communicators. When sensing data associated with an item set to true is stored in a queue of each of the other slave battery management apparatuses, the sensing data may be ignored instead of being transmitted.

In the sensing data collection stage, each of the slave battery management apparatuses 120-1-1 through 120-3-4 transmits its own sensing data to a neighboring slave battery management apparatus and relays sensing data received from another neighboring battery management apparatus. Thus, the master battery management apparatus 110 may collect sensing data of each of the slave battery management apparatuses 120-1-1 through 120-3-4.

Figure 20:
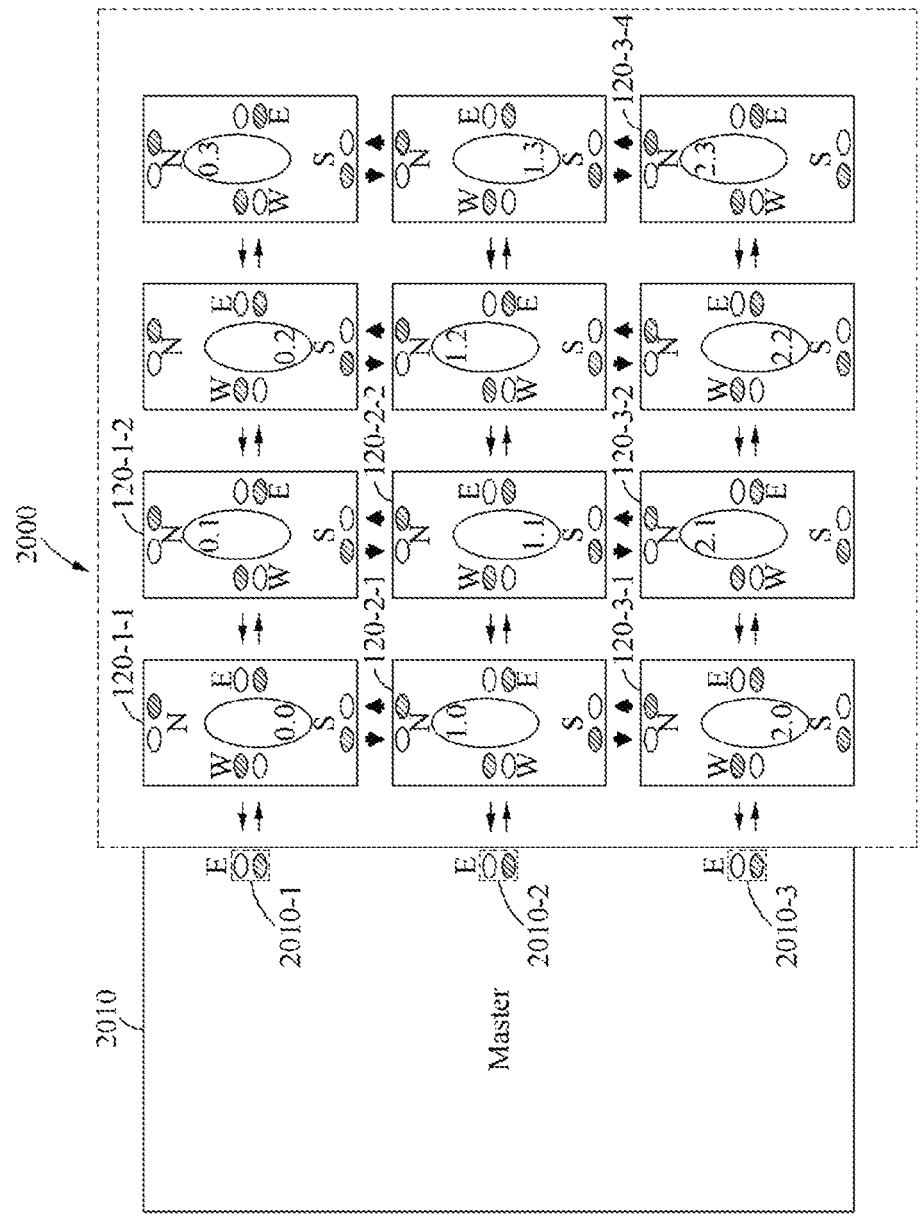
FIG. 20 illustrates another example of a battery management system, in accordance with one or more embodiments.

FIG. 20 illustrates an example of a battery management system 2000 in accordance with one or more embodiments.

Referring to FIG. 20, the battery management system 2000 includes a master battery management apparatus 2010 and slave battery management apparatuses 120-1-1 through 120-3-4.

Unlike the example of FIG. 1, the master battery management apparatus 2010 includes a plurality of IR communicators, for example, IR communicators 2010-1 through 2010-3.

The IR communicator 2010-1 faces the slave battery management apparatus 120-1-1, the IR communicator 2010-2 faces the slave battery management apparatus 120-2-1, and the IR communicator 2010-3 faces the slave battery management apparatus 120-3-1.

The battery management system 2000 performs an initialization stage. In the example of FIG. 20, since a slave battery management apparatus facing each of the IR communicators 2010-1 through 2010-3 exists, the master battery management apparatus 2010 determines that each of the IR communicators 2010-1 through 2010-3 is active. Additionally, each of the slave battery management apparatuses 120-1-1 through 120-3-4 may determine a status of each of the IR communicators.

The battery management system 2000 performs an identification stage. For example, the master battery management apparatus 2010 transmits an address assignment message "0.0.E" to the slave battery management apparatus 120-1-1 using the IR communicator 2010-1, transmits an address assignment message "1.0.E" to the slave battery management apparatus 120-2-1 using the IR communicator 2010-2, and transmits an address assignment message "2.0.E" to the slave battery management apparatus 120-3-1 using the IR communicator 2010-3. The slave battery management apparatus 120-1-1 transmits an address assignment message "0.1.E" to the slave battery management apparatus 120-1-2, and the slave battery management apparatus 120-2-1 transmits an address assignment message "1.1.E" to the slave battery management apparatus 120-2-2. Additionally, the slave battery management apparatus 120-3-1 transmits an address assignment message "2.1.E" to the slave battery management apparatus 120-3-2. Similarly, each of the other slave battery management apparatuses may receive an address assignment message from a neighboring slave battery management apparatus and may set an address.

The identification stage described above with reference to FIGS. 3 through 7 is applicable to the battery management system 2000, and thus further description of the identification stage of the battery management system 2000 is not repeated herein.

The battery management system 2000 performs a synchronization stage. For example, the master battery management apparatus 2010 transmits a synchronization message to the slave battery management apparatus 120-1-1 using the IR communicator 2010-1, transmits a synchronization message to the slave battery management apparatus 120-2-1 using the IR communicator 2010-2, and transmits a synchronization message to the slave battery management apparatus 120-3-1 using the IR communicator 2010-3. Each of the slave battery management apparatuses 120-1-1, 120-2-1 and 120-3-1 transmits a synchronization message to a neighboring slave battery management apparatus using an IR communicator that is not used for reception among active IR communicators. Similarly, each of the other slave battery management apparatuses may transmit a synchronization message to a neighboring slave battery management apparatus using an IR communicator that is not used for reception among active IR communicators. Thus, the synchronization messages may spread to the slave battery management apparatuses 120-1-1 through 120-3-4.

The synchronization stage described above with reference to FIGS. 13 and 14 is applicable to the battery management system 2000, and thus further description of the synchronization stage of the battery management system 2000 is not repeated herein.

The battery management system 2000 performs a sensing data collection stage.

For example, sensing data of each of the slave battery management apparatuses 120-1-1 through 120-3-4 is transmitted to the master battery management apparatus 2010 as described above with reference to FIGS. 15 through 19.

Figure 21:
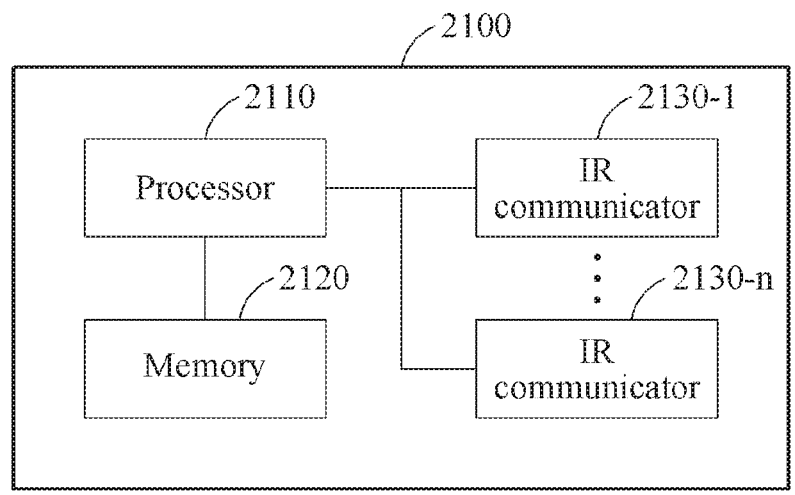
FIG. 21 is a block diagram illustrating an example of a battery management apparatus, in accordance with one or more embodiments.

FIG. 21 illustrates an example of a battery management apparatus 2100.

The battery management apparatus 2100 of FIG. 21 corresponds to, for example, each of the slave battery management apparatuses 120-1-1 through 120-3-4.

Referring to FIG. 21, the battery management apparatus 2100 includes a processor 2110 or one or more processors 2110, a memory 2120 or one or more memories 2120, and a plurality of IR communicators 2130-1 through 2130-n.

The memory 2120 may store any one or any combination of an acknowledgement message, a synchronization message and sensing data received from a neighboring battery management apparatus.

The processor 2110 may receive an address assignment message from the neighboring battery management apparatus using at least one of the IR communicators 2130-1 through 2130-n, and set an address of the battery management apparatus 2100 based on the received address assignment message. For example, a processor in the slave battery management apparatus 120-1-1 may receive an address assignment message "0.0.E" from the master battery management apparatus 110 using the IR communicator 220-1, and may set an address to "0.0" based on the received address assignment message "0.0.E".

The processor 2110 may determine an address of another neighboring battery management apparatus based on the set address, and transmit an address assignment message including the determined address to the other neighboring battery management apparatus using another one among the IR communicators 2130-1 through 2130-n. For example, the processor in the slave battery management apparatus 120-1-1 may determine an address of the slave battery management apparatus 120-2-1 facing the IR communicator 220-2 to be "1.0", and may transmit an address assignment message "1.0.S" including the determined address "1.0" to the slave battery management apparatus 120-2-1. Additionally, the processor in the slave battery management apparatus 120-1-1 may determine an address of the slave battery management apparatus 120-1-2 facing the IR communicator 220-3 to be "0.1", and may transmit an address assignment message "0.1.E" including the determined address "0.1" to the slave battery management apparatus 120-1-2.

The processor 2110 may transmit an acknowledgement message including the address of the battery management apparatus 2100 to the neighboring battery management apparatus. For example, the one or more processors in the slave battery management apparatus 120-1-1 may transmit an acknowledgement message A(0.0) including an address "0.0" to the master battery management apparatus 110 using the IR communicator 220-1.

The processor 2110 may receive an acknowledgement message including an address of the other neighboring battery management apparatus from the other neighboring battery management apparatus, and transmits the received acknowledgement message to the neighboring battery management apparatus. For example, the processor in the slave battery management apparatus 120-1-1 may receive an acknowledgement message A(0.1) including the address "0.1" from the slave battery management apparatus 120-1-2 using the IR communicator 220-3, and may transmit the acknowledgement message A(0.1) to the master battery management apparatus 110. Additionally, the processor in the slave battery management apparatus 120-1-1 may receive an acknowledgement message A(1.0) including the address "1.0" from the slave battery management apparatus 120-2-1 using the IR communicator 220-2, and may transmit the acknowledgement message A(1.0) to the master battery management apparatus 110.

The processor 2110 may receive a synchronization message from the neighboring battery management apparatus using at least one of the IR communicators 2130-1 through 2130-n, and transmit the synchronization message to the other neighboring battery management apparatus using another one of the IR communicators 2130-1 through 2130-n. For example, the processor in the slave battery management apparatus 120-1-1 may receive a synchronization message from the master battery management apparatus 110 using the IR communicator 220-1, and may transmit the synchronization message to each of the slave battery management apparatuses 120-2-1 and 120-1-2.

The processor 2110 may transmit sensing data of a battery corresponding to the battery management apparatus 2100 to the neighboring battery management apparatus. When sensing data is received from the other neighboring battery management apparatus, the processor 2110 transmits the received sensing data to the neighboring battery management apparatus. For example, the processor in the slave battery management apparatus 120-1-1 may transmit sensing data D(0.0) of a battery corresponding to the slave battery management apparatus 120-1-1 to the master battery management apparatus 110 using the IR communicator 220-1. Additionally, the processor in the slave battery management apparatus 120-1-1 may receive sensing data D(0.1) of the slave battery management apparatus 120-1-2 using the IR communicator 220-3, may store the sensing data D(0.1) in the memory 2120, and may transmit the sensing data D(0.1) to the master battery management apparatus 110 using the IR communicator 220-1.

The processor 2110 may determine whether each of the IR communicators 2130-1 through 2130-n is activated. For example, the processor in the slave battery management apparatus 120-1-1 may determine whether a neighboring device facing each of the IR communicators 220-1 through 220-4 exists. Since a neighboring device facing the IR communicator 220-4 does not exist, the processor in the slave battery management apparatus 120-1-1 may determine that the IR communicator 220-4 is inactive. Since a neighboring device facing each of the IR communicators 220-1 through 220-3 exists, the processor in the slave battery management apparatus 120-1-1 may determine that each of the IR communicators 220-1 through 220-3 is active.

The above description provided with reference to FIGS. 1 through 20 is also applicable to the example of FIG. 21, and thus is not repeated herein.

Figure 22:
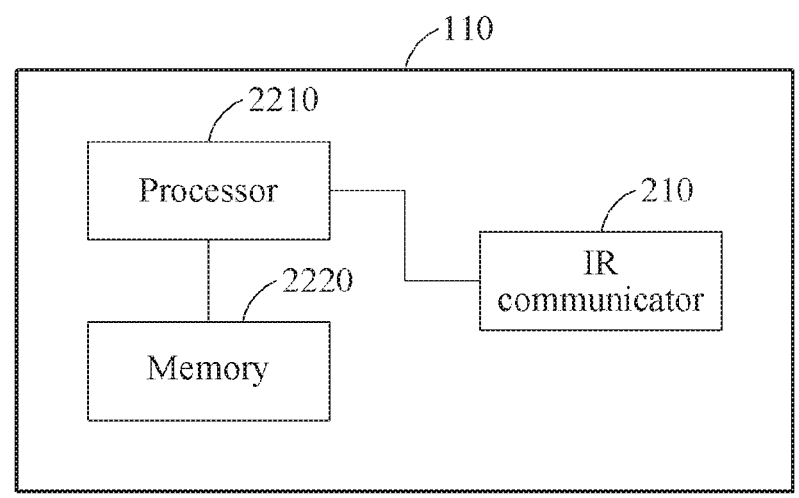
FIG. 22 is a block diagram illustrating an example of a master battery management apparatus, in accordance with one or more embodiments.

FIG. 22 illustrates an example of a master battery management apparatus 110.

Referring to FIG. 22, the master battery management apparatus 110 includes a processor 2210 or one or more processors 2210, a memory 2220 or one more memories 2220, and an IR communicator 210 or one or more IP communicators 210.

The processor 2210 may determine whether the IR communicator 210 is active.

The processor 2210 may transmit an address assignment message and a synchronization message to the slave battery management apparatus 120-1-1 using the IR communicator 210.

The processor 2210 may receive sensing data of each of the slave battery management apparatuses 120-1-1 through 120-3-4 using the IR communicator 210, and may store the sensing data in the memory 2220.

The processor 2210 may determine state information of each of the batteries based on the sensing data of each of the slave battery management apparatuses 120-1-1 through 120-3-4. The state information may include, as non-limiting examples, at least one of a state of charge (SOC) and a state of health (SOH).

Depending on examples, the master battery management apparatus 110 may include a plurality of IR communicators, for example, the IR communicators 2010-1 through 2010-3, as described above with reference to FIG. 20.

The above description provided with reference to FIGS. 1 through 21 is also applicable to the example of FIG. 22, and thus is not repeated herein.

The master battery management apparatus 110, the battery management apparatus 2100, slave battery management apparatuses 120-1-1 through 120-3-4, processor 2110, memory 2120, IR communicators 2130-1 to 2130-n, processor 2210, memory 2220, IR communicator 210, other apparatuses, units, modules, devices, and other components described herein and with respect to FIGS. 1-22 are implemented as, and by, hardware components. Examples of hardware components that may be used to perform the operations described in this application where appropriate include controllers, sensors, generators, drivers, memories, comparators, arithmetic logic units, adders, subtracters, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application and illustrated in FIGS. 1-22 are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to the one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery management apparatus comprising:
   a processor configured to:
   receive a first address assignment message from a first neighboring battery management apparatus through a first infrared (IR) communicator,
   set an address of the battery management apparatus based on the received first address assignment message,
   determine an address of a second neighboring battery management apparatus based on the set address, and
   transmit a second address assignment message including the determined address to the second neighboring battery management apparatus through a second IR communicator.

2. The battery management apparatus of claim 1, wherein the received first address assignment message comprises an address of the battery management apparatus determined by the first neighboring battery management apparatus, and an identifier of an IR communicator of the first neighboring battery management apparatus.

3. The battery management apparatus of claim 1, wherein the processor is further configured to set an identifier of each of a plurality of IR communicators included in the battery management apparatus based on the received first address assignment message.

4. The battery management apparatus of claim 1, wherein the processor is further configured to transmit an acknowledgement message including the set address to the first neighboring battery management apparatus.

5. The battery management apparatus of claim 4, wherein the processor is further configured to update a message transmission table in response to the transmitted acknowledgement message being received.

6. The battery management apparatus of claim 1, wherein the processor is further configured to:
receive an acknowledgement message including the address of the second neighboring battery management apparatus from the second neighboring battery management apparatus; and
transmit the received acknowledgement message to the first neighboring battery management apparatus.

7. The battery management apparatus of claim 1, wherein the processor is further configured to receive a synchronization message from the first neighboring battery management apparatus through the first IR communicator, and transmit the received synchronization message to the second neighboring battery management apparatus through the second IR communicator.

8. The battery management apparatus of claim 7, wherein the processor is further configured to determine a sensing timing based on the received synchronization message.

9. The battery management apparatus of claim 1, wherein the processor is further configured to:
transmit sensing data of a battery corresponding to the battery management apparatus to the first neighboring battery management apparatus, and
in response to receiving sensing data from the second neighboring battery management apparatus, transmit the received sensing data to the first neighboring battery management apparatus.

10. The battery management apparatus of claim 1, wherein the processor is further configured to determine whether each of a plurality of IR communicators in the battery management apparatus is activated.

11. A battery management system comprising:
a plurality of slave battery management apparatuses; and
a master battery management apparatus configured to control the plurality of slave battery management apparatuses,
wherein at least one of the slave battery management apparatuses is configured to
receive a first address assignment message from a first neighboring slave battery management apparatus through a first infrared (IR) communicator,
set an address of each of the slave battery management apparatuses based on the first received address assignment message,
determine an address of a second neighboring slave battery management apparatus based on the set address, and
transmit a second address assignment message including the determined address to the second neighboring slave battery management apparatus through a second IR communicator.

12. The battery management system of claim 11, wherein the received first address assignment message comprises an address determined by the first neighboring slave battery management apparatus, and an identifier of an IR communicator of the first neighboring slave battery management apparatus.

13. The battery management system of claim 11, wherein at least one of the slave battery management apparatuses is configured to set an identifier of each of a plurality of IR communicators based on the received first address assignment message.

14. The battery management system of claim 11, wherein at least one of the plurality of slave battery management apparatuses is configured to transmit an acknowledgement message including the set address to the first neighboring slave battery management apparatus.

15. The battery management system of claim 14, wherein at least one of the plurality of slave battery management apparatuses is configured to update a message transmission table in response to the transmitted acknowledgement message being received.

16. The battery management system of claim 11, wherein at least one of the slave battery management apparatuses is configured to:
receive an acknowledgement message including the address of the second neighboring slave battery management apparatus from the second neighboring slave battery management apparatus, and
transmit the received acknowledgement message to the first neighboring slave battery management apparatus.

17. The battery management system of claim 11, wherein at least one of the plurality of slave battery management apparatuses is configured to receive a synchronization message from the first neighboring slave battery management apparatus through the first IR communicator, and transmit the received synchronization message to the second neighboring slave battery management apparatus through the second IR communicator.

18. The battery management system of claim 17, wherein at least one of the plurality of slave battery management apparatuses is configured to determine a sensing timing based on the received synchronization message.

19. The battery management system of claim 11, wherein at east one of the plurality of slave battery management apparatuses is configured to:
transmit sensing data of a corresponding battery to the first neighboring slave battery management apparatus, and
in response to receiving sensing data from the second neighboring slave battery management apparatus, transmit the received sensing data to the first neighboring slave battery management apparatus.

20. The battery management system of claim 18, wherein at least one of the plurality of slave battery management apparatuses is configured to determine whether each of a plurality of IR communicators is activated.

* * * * *